(12) United States Patent
Zhang et al.

(10) Patent No.: US 8,158,089 B2
(45) Date of Patent: Apr. 17, 2012

(54) COMPOSITIONS AND METHODS FOR WASTEWATER TREATMENT

(75) Inventors: Tianxi Zhang, Pullman, WA (US); Keith E. Bowers, Seattle, WA (US); Joseph H. Harrison, Puyallup, WA (US); Shulin Chen, Pullman, WA (US)

(73) Assignees: Washington State University Research Foundation, Pullman, WA (US); Multiform Harvest, Inc., Seattle, WA (US)

( * ) Notice: Subject to any disclaimer, the term of this patent is extended or adjusted under 35 U.S.C. 154(b) by 124 days.

(21) Appl. No.: 12/172,884

(22) Filed: Jul. 14, 2008

(65) Prior Publication Data

US 2009/0013742 A1    Jan. 15, 2009

Related U.S. Application Data

(60) Provisional application No. 60/949,497, filed on Jul. 12, 2007.

(51) Int. Cl.
*C01F 1/00* (2006.01)
(52) U.S. Cl. ............ 423/155; 423/157.2; 423/158; 71/32; 210/600; 210/702
(58) Field of Classification Search ............ 423/155, 423/157.2, 158; 71/32; 210/600, 702
See application file for complete search history.

(56) References Cited

U.S. PATENT DOCUMENTS

2004/0035162 A1* 2/2004 Williams et al. ............ 71/28

OTHER PUBLICATIONS

Adnan et al., "Pilot-scale study of phosphorus recovery through struvite crystallization—examining the process feasibility," Journal of Environmental Engineering and Science, 2003, pp. 315-324, vol. 2.

Battistoni et al., "Phosphate Removal in Anaerobic Liquors by Struvite Crystallization Without Addition of Chemicals: Preliminary Results," Water Resources, 1997, pp. 2925-2929, vol. 31.

Battistoni et al., "Phosphorus Removal from Anaerobic Supernatants: Start-Up and Steady-State Conditions of a Fluidized Bed Reactor Full-Scale Plant," Industrial & Engineering Chemistry Research, 2006, pp. 663-669, vol. 45.

Bowers et al., "Design of Cone-Shaped Fluidized Bed Struvite Crystallizers for Phosphorus Removal from Wastewater," Transactions of the American Society of Agricultural Engineers, 2005 pp. 1-10, vol. 48.

(Continued)

*Primary Examiner* — Melvin Mayes
*Assistant Examiner* — Melissa Stalder
(74) *Attorney, Agent, or Firm* — Barry L. Davison; Davis Wright Tremaine LLP

(57) ABSTRACT

Particular aspects provide a method for recovering phosphate, comprising: obtaining an effluent or wastewater, etc. having calcium-sequestered phosphate; adding to the effluent or wastewater a calcium chelating or sequestration agent suitable to chelate or sequester $Ca^{++}$ ions from the calcium-sequestered phosphate to facilitate release of phosphate from the calcium-sequestered phosphate; transferring, facilitated by said $Ca^{++}$ ion capture and in the presence of sufficient concentrations of $NH_4^+$ and $Mg^2$ ions, of the phosphate into struvite (magnesium ammonium phosphate hexahydrate or $MgNH_4PO_4.6H_2O$), or hydrated magnesium ammonium complex of phosphate; and recovering the struvite, or the formed hydrated magnesium ammonium complex. Preferably, the method further comprises acidification of the effluent or wastewater to facilitate release of $Ca^{++}$ ions from the calcium-sequestered phosphate and chelation of sequestration of the $Ca^{++}$ ions by the calcium chelating or sequestration agent. Additional aspects provide a phosphate-containing fertilizer comprising struvite, and methods for making same.

23 Claims, 7 Drawing Sheets

OTHER PUBLICATIONS

Bowers et al., "Performance of Cone-Shaped Fluidized Bed Struvite Crystallizers in Removing Phosphorus from Wastewater," Transactions of the American Society of Agricultural Engineers, 2005 pp. 1-8, vol. 48.

Bowers et al, "Phosphorus Removal by Struvite Crystallization in Various Livestock Wastewaters," Proceedings of the International Symposium on Air Quality and Waste Management for Agriculture, sponsored by the American Society of Agricultural and Biological Engineers, Sep. 16-19, 2007, Broomfield, Colorado, Publication 701P0907cd of the ASABE, St. Joseph, Michigan (8 pages).

Burns et al., "Laboratory and In-Situ Reductions of Soluble Phosphorus in Swine Waste Slurries," Environmental Technology, 2001, pp. 1273-1278, vol. 22.

Doyle et al., "Struvite formation, control and recovery," Water Research, 2002, pp. 3925-3940, vol. 36.

Driver et al., "Why Recover Phosphorus for Recycling, and How?," Environmental Technology, 1999, pp. 651-662, vol. 30.

Edwards et al., "Environmental Impacts of On-Farm Poultry Waste Disposal—A Review," Bioresource Technology, 1992, pp. 9-33, vol. 41.

Heathwaite et al., "A Conceptual Approach for Integrating Phosphorus and Nitrogen Management at Watershed Scales," Journal of Environmental Quality, 2000, pp. 158-166, vol. 29.

International Fertilizer Industry Association, Fertilizer Consumption Statistics, 2002, Paris, France.

Isherwood et al., "Global Projection of the Availability of Raw Materials for the Production of Major Nutrients," Annual Meeting of the American Society of Agronomy, Crop Science Society of America and Soil Science Society of America, Minneapolis, Nov. 5-9, 2000 (12 pages).

Jeong et al., "Optimum doses of Mg and P salts for precipitating ammonia into struvite crystals in aerobic composting," Bioresource Technology, 2005, pp. 1-6, vol. 96.

Le Corre et al., "Impact of calcium on struvite crystal size, shape and purity," Journal of Crystal Growth, 2005, pp. 514-522, vol. 283.

Liberti et al., "The 10 $m^3$ $h^{-1}$ RIM-NUT Demonstration Plant at West Bari for Removing and Recoveirng N and P from Wastewater," Water Resources, 1986, pp. 735-739, vol. 20.

Nelson et al., "Struvite precipitation in anaerobic swine lagoon liquid: effect of pH and Mg:P ratio and determination of rate constant," Bioresource Technology, 2003, pp. 229-236, vol. 89.

OI Analytical (College Station, Texas), "Orthophosphate, USEPA by Flow Injection Analysis (FIA) (Cartridge Part #A001558)," 2000, 20 pages.

OI Analytical (College Station, Texas), "Total Phosphorus, USEPA by Flow Injection Analysis (FIA) (Cartridge Part #A001558)," 2000, 23 pages.

Sung et al., "Performance of temperature-phased anaerobic digestion (TPAD) system treating dairy cattle wastes," Water Research, 2003, pp. 1628-1636, vol. 37.

Suzuki et al., "Recovery of phosphorus from swine wastewater through crystallization," Bioresource Technology, 2005, pp. 1544-1550, vol. 96.

Wrigley et al., "A Laboratory Study of Struvite Precipitation after Anaerobic Digestion of Piggery Wastes," Bioresource Technology, 1992, pp. 117-121, vol. 41.

Zhang et al., "Evaluation of Two-Stage Anaerobic Sequencing Batch Reactor Systems for Animal Wastewater Treatment," Transactions of the American Society of Agricultural Engineers, 2000, pp. 1795-1801, vol. 43.

Zhang et al., "Phosphorus Reduction in Dairy Effluent through Flocculation," Proceedings of the 2006 Annual Meeting of the American Society of Agricultural and Biological Engineers, 2006, Paper 064200 of the ASABE, St. Joseph, Michigan (10 pages).

Zhang et al., "Releasing Phosphorus from Calcium for Struvite Fertilizer Production from Anaerobically Digested Dairy Effluent," unpublished, submitted to Bioresource Technology, 2006, and to Water Environment Research, 2008, 32 pages.

Bouropoulos et al., "Spontaneous precipitation of struvite from aqueous solutions," Journal of Crystal Growth, 2000, pp. 381-388, vol. 213.

* cited by examiner

COMPOSITIONS AND METHODS FOR WASTEWATER TREATMENT

CROSS-REFERENCE TO RELATED APPLICATIONS

This application claims the benefit of priority to U.S. Provisional Patent Application Ser. No. 60/949,497, filed 12 Jul. 2007 and entitled "COMPOSITIONS AND METHODS FOR WASTEWATER TREATMENT," which is incorporated herein by reference in its entirety.

STATEMENT REGARDING FEDERALLY-SPONSORED RESEARCH

This work was supported at least in part by a Conservation and Innovation Grant No. NRCS 68-3A75-4-201 from the U.S. Department of Agriculture Natural Resource Conservation Service, and the United States government therefore has certain rights.

FIELD OF THE INVENTION

Aspects of the present invention relate generally to wastewater treatment or processes, and more particularly to novel methods for recovery of phosphate from effluents (e.g., wastewater, animal wastewater, swine lagoon wastewater, dairy lagoon wastewater, dairy digester effluent, etc.) comprising bound-phosphate that has heretofore not been recoverable by virtue of being bound in refractory suspensions, and particular embodiments relate to methods for production of magnesium/phosphate complexes (e.g., struvite; magnesium ammonium phosphate hexahydrate or $MgNH_4PO_4 \cdot 6H_2O$).

BACKGROUND

The presence of dissolved phosphate in various effluents, such as industrial effluents, wastewater, animal/livestock wastewater, etc., is a long-standing problem in the art. For example, the majority of phosphate ions ($PO_4^{3-}$) in anaerobically digested dairy effluent is sequestered in a finely-suspended, intractable calcium-phosphate solid, and is effectively unavailable for practical and efficient recovery by current methods.

Phosphorus (referred to herein as "P") is a non-renewable resource and an important non-substitutable macronutrient, existing in nature as phosphates in various inorganic or organic forms, and ranging from the simple to the very complex in terms of molecular structure. Because P is essential for all biological processes, there is concern that the current demand and exploitation (total annual production is about 20 million tons of P, derived from roughly 140 million tons of rock concentrates (2)) of this non-renewable resource is not sustainable. Nearly all the P used globally is mined from a relatively small number of commercially-exploitable deposits, and it has been estimated that the global economic P reserves may last about 100 years at the current rate of extraction (1). Therefore, the world's P resources are finite and should be used efficiently and in a sustainable way. Additionally, aside from the non-renewable resource aspect, there is need to improve P management, particularly from the environment protection perspective because, for example, P-enrichment in receiving waters is associated with harmful algae blooms that affect the health and vitality of wetlands and marine environments.

Therefore, there is a pronounced need in the art to develop methods for increasing the life expectancy of the world's limited P resources. There is a pronounced need in the art to develop methods for recovery and recycling of P from, for example, effluents and waste materials. There is a pronounced need in the art to develop methods for more efficient use of P in agriculture, both as fertilizers and animal manures.

One of the main potential sources for P recycling is animal manure because of its high P content, and large amounts of manure are produced annually in the world, particularly from concentrated animal feeding operations (CAFOs). Currently, the dominant management practice is direct land disposal of the manure. However, a significant disadvantage or challenge associated with such direct land disposal of manure is the limited land available for such disposal, and the water contamination that can potentially occur from the excess nutrients that accumulate as a result of long-term manure application (3, 4). One alternative to direct land disposal manure management is the use of anaerobic digestion (AD) technology. AD, with its conversion of the manure's organic carbon to biogas, and AD has become an option for the utilization and treatment of animal manure. However, since AD does not remove any nutrients during the process, the digested effluent still maintains a high sequestered P concentration (5, 6). Ideally, the excess P in the effluent should be recovered before the effluent goes to storage and disposal on land to enable more efficient controlled use of the P, and to preclude contamination of water resources.

Struvite (magnesium ammonium phosphate hexahydrate or $MgNH_4PO_4 \cdot 6H_2O$). Generally, art-recognized P removal technologies applied to wastewater include chemical and biological processes. However, biological methods that incorporate P in microbial biomass are not optimal or particularly suitable for animal manure because the high P content would yet produce large quantities of biosolids to be disposed of. Chemical methods include settling, flocculation, precipitation, and electrocoagulation, etc. A recently developing chemical technology for P removal and recovery is crystallization of P in the form of struvite (magnesium ammonium phosphate hexahydrate or $MgNH_4PO_4 \cdot 6H_2O$) (7-12). Struvite is crystalline and thus well suited for removal in a crystallizer. In addition, as a granular product struvite is more compact than other chemical precipitates, and it performs well as a slow-release fertilizer. Struvite formation requires reaction between three soluble ions in solution, $Mg^{2+}$, $NH_4^+$ and $PO_4^{3-}$, to form precipitates with low solubility (struvite has a pKsp of 12.6). Struvite precipitation is controlled by pH, supersaturation, and presence of impurities, such as calcium 13, 14). High pH (e.g., pH 8.5) and supersaturation of the three ions ($Mg^{2+}$, $NH_4^+$ and $PO_4^{3}$) are favorable to struvite formation. Struvite crystallization for P recovery has been successfully demonstrated in lab, pilot, and full-scale models using swine wastewater, and several crystallizer reactors have been designed and operated through this process both in pilot and field scale (16-19). High total P removal (~80%) was obtained in the field scale tests (18), indicating that this crystallization process can be used for P recovery from swine wastewater.

Unfortunately, however, struvite precipitation has not been proven effective in digested dairy effluent, which has different properties than swine wastewater (20). For example, in the present Applicants' previous work, P removal from dairy effluent was investigated using a struvite crystallizer designed as a cone-shaped fluidized bed reactor, and the crystallizer was used to achieve high P removal (~80%) from swine wastewater (18). However, surprisingly, poor P removal (<15%) was obtained under various conditions (20) for treating dairy effluent from an anaerobic digester. The results suggested that the P was not available as an ionic form after anaerobic digestion of the dairy manure. Instead, the majority of the P was in a fine suspended solid form.

There is therefore, not only a pronounced need in the art for novel methods for recovery and recycling of P from, for example, effluents and waste materials, but also a pronounced need for novel methods for recovery of P in the form of struvite.

SUMMARY OF THE INVENTION

Particular aspects provide a method for making phosphate available for recovery from a fluid composition, effluent, wastewater or solution having calcium-sequestered phosphate, comprising: obtaining a fluid composition, effluent, wastewater or solution comprising calcium-sequestered phosphate; adding to the fluid composition, effluent, wastewater or solution a calcium chelating or sequestration agent suitable to chelate or sequester $Ca^{++}$ ions from the calcium-sequestered phosphate to facilitate release of phosphate from the calcium-sequestered phosphate; accumulating, facilitated by said $Ca^{++}$ ion capture, the released phosphate. In particular aspects, accumulating is in the presence of sufficient concentrations of $NH_4^+$ and $Mg^{+2}$ ions and at a pH sufficient to ensure that a sufficient proportion of phosphate ions are completely deprotonated, and comprises accumulating into struvite (magnesium ammonium phosphate hexahydrate or $MgNH_4PO_4.6H_2O$), or hydrated magnesium ammonium complex of phosphate.

Additional aspects comprise a method for providing a phosphate-containing fertilizer, comprising: obtaining a fluid composition, effluent, wastewater or solution comprising calcium-sequestered phosphate; adding to the fluid composition, effluent, wastewater or solution a calcium chelating or sequestration agent suitable to chelate or sequester $Ca^{++}$ ions from the calcium-sequestered phosphate to facilitate release of phosphate from the calcium-sequestered phosphate; accumulating, facilitated by said $Ca^{++}$ ion capture, the released phosphate.

In certain aspects, the method further comprises recovering the struvite, or the formed hydrated magnesium ammonium complex.

In particular aspects, the method further comprises acidification of the fluid composition, effluent, wastewater or solution to facilitate release of $Ca^{++}$ ions from the calcium-sequestered phosphate, and chelation of sequestration of the $Ca^{++}$ ions by the calcium chelating or sequestration agent. In particular embodiments, acidification is by means of addition of hydrochloric acid.

In certain aspects, the agent suitable to chelate or sequester $Ca^{++}$ ions from the calcium-sequestered phosphate is at least one selected from the group consisting of citric acid, citrate-containing substances, EDTA, ethylenediaminetetraacetate-containing substances, EGTA, EGTA anion-containing substances, oxalic acid, and oxalate-containing substances.

In particular embodiments, the sufficient concentration of at least one of $NH_4^+$ and $Mg^2$ ions is present in the effluent, wastewater or solution. In certain aspects, the sufficient concentration of $NH_4^+$ ion is present in the effluent, wastewater or solution, and $Mg^{+2}$ is subsequently added to a sufficient level. In particular aspects, the sufficient concentration of at least one of $NH_4^+$ and $Mg^{+2}$ ions is added to the effluent, wastewater or solution either before, during or after adding the agent suitable to provide for chelating or sequestering $Ca^{++}$ ions from the calcium-sequestered phosphate. In certain embodiments, the sufficient concentration of at least one of $NH_4^+$ and $Mg^{+2}$ ions is added to the effluent, wastewater or solution after adding the agent suitable to provide for chelating or sequestering $Ca^{++}$ ions from the calcium-sequestered phosphate.

Additional embodiments provide a fertilizer prepared by the inventive methods.

Further aspects provide methods for recovering phosphate from a fluid composition, effluent, wastewater or solution having calcium-sequestered phosphate, comprising: obtaining a fluid composition, effluent, wastewater or solution comprising calcium-sequestered phosphate; adding to the fluid composition, effluent, wastewater or solution a calcium chelating or sequestration agent suitable to chelate or sequester $Ca^{++}$ ions from the calcium-sequestered phosphate to facilitate release of phosphate from the calcium-sequestered phosphate; transferring, facilitated by said $Ca^{++}$ ion capture and in the presence of sufficient concentrations of $NH_4^+$ and $Mg^{+2}$ ions, of phosphate into struvite (magnesium ammonium phosphate hexahydrate or $MgNH_4PO_4.6H_2O$), or hydrated magnesium ammonium complex of phosphate; and recovering the struvite, or the formed hydrated magnesium ammonium complex.

Additional aspects, provide methods for providing a phosphate-containing fertilizer, comprising: obtaining a fluid composition, effluent, wastewater or solution comprising calcium-sequestered phosphate; adding to the fluid composition, effluent, wastewater or solution a calcium chelating or sequestration agent suitable to chelate or sequester $Ca^{++}$ ions from the calcium-sequestered phosphate to facilitate release of phosphate from the calcium-sequestered phosphate; transferring, facilitated by said $Ca^{++}$ ion capture and in the presence of sufficient concentrations of $NH_4^+$ and $Mg^{+2}$ ions, of phosphate into struvite (magnesium ammonium phosphate hexahydrate or $MgNH_4PO_4.6H_2O$), or hydrated magnesium ammonium complex of phosphate; recovering the struvite, or the other formed hydrated magnesium ammonium complex; providing the recovered struvite, or the recovered other formed hydrated magnesium ammonium complex as a phosphate-containing fertilizer.

In certain embodiments of the above methods, transferring, in the presence of sufficient concentrations of $NH_4^+$ and $Mg^{+2}$ ions, of phosphate is into struvite (magnesium ammonium phosphate hexahydrate or $MgNH_4PO_4.6H_2O$).

In particular aspects, the methods, further comprise acidification of the fluid composition, effluent, wastewater or solution to facilitate release of $Ca^{++}$ ions from the calcium-sequestered phosphate, and chelation of sequestration of the $Ca^{++}$ ions by the calcium chelating or sequestration agent. In certain aspects, acidification is by means of addition of hydrochloric acid.

In certain embodiments, the agent suitable to chelate or sequester $Ca^{++}$ ions from the calcium-sequestered phosphate is at least one selected from the group consisting of citric acid, citrate salts, ethylenediaminetetraacetic acid (EDTA), ethylenediaminetetraacetate salts, oxalic acid, and oxalate salts. In particular aspects, the sufficient concentration of at least one of $NH_4^+$ and $Mg^{+2}$ ions is present in the effluent, wastewater or solution. In particular embodiments, the sufficient concentration of $NH_4^+$ ion is present in the effluent, wastewater or solution, and $Mg^{+2}$ is subsequently added to a sufficient level. In certain aspects, the sufficient concentration of at least one of $NH_4^+$ and $Mg^{+2}$ ions is added to the effluent, wastewater or solution either before, during or after adding the agent suitable to provide for chelating or sequestering $Ca^{++}$ ions from the calcium-sequestered phosphate. In certain embodiments, the sufficient concentration of at least one of $NH_4^+$ and $Mg^{+2}$ ions is added to the effluent, wastewater or solution after adding the agent suitable to provide for chelating or sequestering $Ca^{++}$ ions from the calcium-sequestered phosphate.

Further aspects provide a fertilizer prepared by the inventive methods. Preferably, the fertilizer comprises struvite.

In certain embodiments, the fertilizer comprises struvite along with one or more other constituents present in the initial effluent, wastewater or solution that are present, at least to some extent, in the fertilizer (e.g, in the formed struvite (magnesium ammonium phosphate hexahydrate or $MgNH_4PO_4.6H_2O$), or the formed other hydrated magnesium ammonium complex of phosphate.

DETAILED DESCRIPTION OF THE INVENTION

Figure 1:
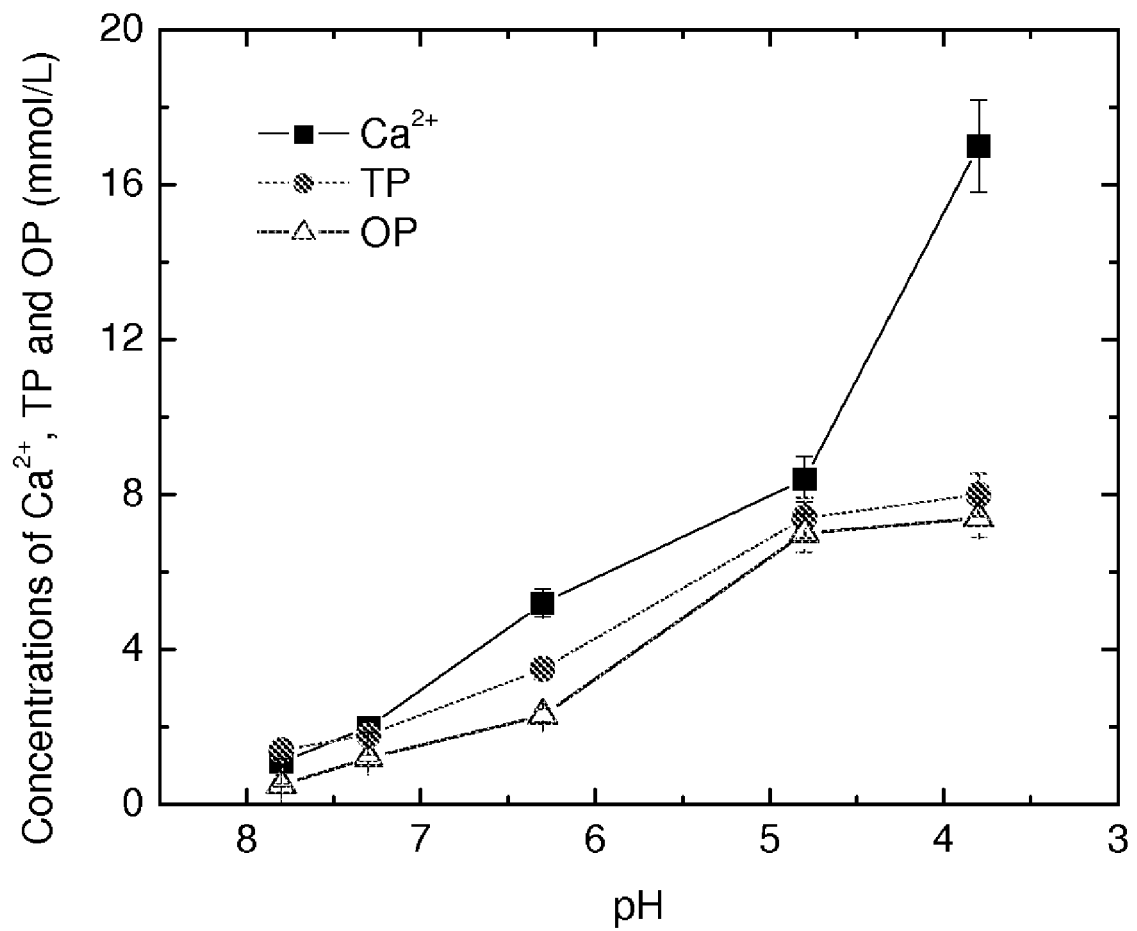
FIG. 1, shows, according to particular exemplary aspects, calcium, TP, and OP in solution after acidification of AD-treated dairy effluent.

Particular aspects provide a method comprising adding a material to a wastewater containing calcium (Ca) and phosphorus (P) to ease the removal of phosphorus. The added material reduces interference by (or "blocks") Ca in the removal of P. Ca can interfere with P removal in at least two ways: (1) by tying the P up as a fine suspended solid containing Ca and P, thus rendering the P unavailable for removal; and (2) coating surfaces intended to receive a P-containing precipitate with a non-P-containing material containing Ca (e.g., CaCO3), thus reducing the ability of those surfaces to serve as a substrate for the P-containing precipitate. The added material, or "blocker," preferably bonds tightly with Ca, forming either a dissolved Ca-containing species or a solid Ca-containing material. For example, adding EDTA (ethylenediaminetetraacetic acid), citric acid, or other chelating blocker forms Ca-EDTA or calcium citrate, dissolved chelates. Another example is addition of oxalic acid or other precipitating blocker, which forms calcium oxalate or other calcium salts of low solubility. The blocker can be added either as a pre-treatment to a P-removing process or as part of the P-removing process itself. An example of the former method is to pretreat wastewater with EDTA, thus freeing the P, and also acidifying if necessary as part of this pretreatment to prevent the P from then precipitating prematurely as a salt with other species contained in the water. The wastewater thus pre-treated is then subjected to a P-removal process in which chemical adjustments are made, such as pH-raising, to precipitate the P as struvite. An example of the latter method is to add EDTA or other blocker to the wastewater at the same time, or nearly the same time, as the wastewater is in contact with struvite surfaces (or other precipitation surface) to capture struvite (or other P salt) as the P is released by the EDTA or other blocker.

Particular aspects provide a method for recovering phosphate, comprising: obtaining an effluent or wastewater, etc. having calcium-sequestered phosphate; adding to the effluent or wastewater a calcium chelating or sequestration agent suitable to chelate or sequester $Ca^{++}$ ions from the calcium-sequestered phosphate to facilitate release of phosphate from the calcium-sequestered phosphate; transferring, facilitated by said $Ca^{++}$ ion capture and in the presence of sufficient concentrations of $NH_4^+$ and $Mg^{+2}$ ions, of the phosphate into struvite (magnesium ammonium phosphate hexahydrate or $MgNH_4PO_4.6H_2O$), or hydrated magnesium ammonium complex of phosphate; and recovering the struvite, or the formed hydrated magnesium ammonium complex. Preferably, the method further comprises acidification of the effluent or wastewater to facilitate release of $Ca^{++}$ ions from the calcium-sequestered phosphate and chelation of sequestration of the $Ca^{++}$ ions by the calcium chelating or sequestration agent. Additional aspects provide a phosphate-containing fertilizer comprising struvite, and methods for making same.

According to particular exemplary aspects, struvite can be precipitated from, for example, dairy effluent if the P is first released into solution to become available as reactive phosphate ions. As described herein, P liberation from calcium-phosphate solids, identified as potentially depressing struvite crystallization, was investigated using different methods such as acidification and sequestering calcium with citric acid and/or other chelating agents. For example, the effect of various conditions, such as pH and addition of citric acid and ethylenediaminetetraacetic acid (EDTA), on liberation of the P and calcium in solution, were investigated. The solid product obtained after P liberation and processing for struvite precipitation was analyzed by X-ray diffraction (XRD), confirming struvite phase structure. The inventive methods not only have practical implications for P recovery through struvite crystallization from anaerobically digested dairy effluent, but are also expandable into other areas of P chemistry, such as wastewater and other areas where the presence of P is problematic, or were recovery of calcium-sequestered P is desired.

According to particular aspects of the present inventive conception, high calcium (Ca) content contributes to the presence of P as a Ca-sequestered particulate in P-containing effluent and wastewaters by forming a calcium-phosphate suspended solid in the calcium-containing fluid or effluent. For example, according to particular aspects, the majority of P in anaerobically digested (AD-digested) dairy effluent is tied up in a finely-suspended, intractable calcium-phosphate solid, and is therefore effectively unavailable for practical and efficient recovery.

According to particular aspects of the present invention, struvite crystallization requires prior formation of dissolved reactive phosphate, whereas the calcium-phosphate solids, with low solubility, provide little reactive phosphate, thereby blocking struvite crystallization, and thus resulting in poor P reduction in the P-containing effluent (e.g., dairy effluent). Particular aspects provide a method for the efficient recovery of P from, for example, animal wastewater in the form of struvite (MgNH4PO4 .6H2O), which can, in further aspects, be used as a slow-release fertilizer.

According to particular aspects, P liberation through acidification, and sequestering of calcium with citric acid and/or another chelating agent is effective to release and recover the P from the calcium-phosphate solids. The present acidification results demonstrate that most of the P in the digested dairy effluent was released into solution by pH depression. The citric acid, on the other hand, sequestered calcium through strong bonding of citrate with calcium. The P concentration in solution increased significantly with increased citric acid, confirming that most of the P can be liberated from its suspended solid. Similar results were obtained from the use of the chelating agent ethylenediaminetetraacetic acid (EDTA), which has a high stability constant, with calcium as an EDTA-calcium complex dissolved in solution. In additional aspects, the freed P was shown to be precipitated as struvite by providing sufficient solution $Mg^{+2}$ ion concentration.

In further aspects, the solid precipitate obtained from the EDTA treatment was investigated using X-ray diffraction (XRD) analysis, verifying that the phase structure of the precipitate was that of standard struvite. The results from this study not only further confirmed the existence of P in an inorganic particulate form in anaerobically digested dairy effluent, but also provided novel and generalizable methods to release P from calcium-containing effluents and wastewaters, to make the P available for struvite production. The results have practical implications in the design and application of P-removal technologies for dairy wastewater management, and for any other effluent, material, fluid, wastewater, animal wastewater, industrial wastes, etc., that comprise calcium-sequestered P.

Particular aspects of the present invention provide a method for recovering phosphate from an effluent, wastewater or solution comprising calcium-sequestered phosphate, comprising: obtaining an effluent, wastewater or solution comprising calcium-sequestered phosphate; adding to the effluent, wastewater or solution an agent suitable to provide for release of free phosphate from the calcium-sequestered phosphate; forming, in the presence of sufficient concentrations of $NH_4^+$ and $Mg^{+2}$ ions, struvite (magnesium ammonium phosphate hexahydrate or $MgNH_4PO_4.6H_2O$), or another hydrated magnesium ammonium complex of phosphate; and recovering the struvite, or the other formed hydrated magnesium ammonium complex.

Additional aspects provide a method for providing a phosphate-containing fertilizer, comprising: obtaining an effluent, wastewater or solution comprising calcium-sequestered phosphate; adding to the effluent, wastewater or solution an agent suitable to provide for release of free phosphate from the calcium-sequestered phosphate; forming, in the presence of sufficient concentrations of $NH_4^+$ and $Mg^{+2}$ ions, struvite (magnesium ammonium phosphate hexahydrate or $MgNH_4PO_4.6H_2O$), or another hydrated magnesium ammonium complex of phosphate; recovering the struvite, or the other formed hydrated magnesium ammonium complex; providing the recovered struvite, or the recovered other formed hydrated magnesium ammonium complex as a phosphate-containing fertilizer.

Further aspects provide a fertilizer prepared by any of the above methods. In preferred aspects, the fertilizer comprises struvite. In certain embodiments, the fertilizer comprises struvite along with one or more other constituents present in the initial effluent, wastewater or solution that are present, at least to some extent, in the fertilizer (e.g, in the formed struvite (magnesium ammonium phosphate hexahydrate or $MgNH_4PO_4.6H_2O$), or the formed other hydrated magnesium ammonium complex of phosphate.

In certain preferred embodiments of the above methods and compositions, forming, in the presence of sufficient concentrations of $NH_4^+$ and $Mg^{+2}$ ions, is of struvite (magnesium ammonium phosphate hexahydrate or $MgNH_4PO_4.6H_2O$). In certain embodiments, the agent suitable to provide for release of free phosphate from the calcium-sequestered phosphate is at least one selected from the group consisting of an acid, and a calcium chelating agent. In particular aspects, the agent comprises hydrochloric acid. In certain embodiments, the agent comprises citric acid. In certain aspects, the agent comprises EDTA. In certain implementations, the sufficient concentration of at least one of $NH_4^+$ and $Mg^{+2}$ ions is present in the effluent, wastewater or solution. In certain embodiments, the sufficient concentration of $NH_4^+$ ion is present in the effluent, wastewater or solution, and $Mg^{+2}$ is subsequently added to a sufficient level. In certain embodiments, the sufficient concentration of at least one of $NH_4^+$ and $Mg^{+2}$ ions is added to the effluent, wastewater or solution either before, during or after adding the agent suitable to provide for release of free phosphate from the calcium-sequestered phosphate. In particular embodiments, the sufficient concentration of at least one of $NH_4^+$ and $Mg^{+2}$ ions is added to the effluent, wastewater or solution after adding the agent suitable to provide for release of free phosphate from the calcium-sequestered phosphate.

EXAMPLE 1

(Phosphate P was Found to be Releasable from Dairy Effluent, and Further was Found to be Recoverable as Struvite (magnesium ammonium phosphate hexahydrate or $MgNH_4PO_4.6H_2O$))

Materials and Methods

Dairy effluent. Dairy wastewater consisted of effluent, after anaerobic digestion (AD treatment) and solids separation, from/at a dairy farm in Whatcom County of Washington State, and was used in all of the experiments. In the raw effluent, the total phosphorus (TP) content ranged from 6.7 to 9.0 mmol/L (or 208-279 mg/L). The calcium and magnesium ranged from 12.0-26.0 mmol/L (or 480-1040 mg/L) and 5.0-16.0 mmol/L (or 121-389 mg/L), respectively.

Treatments for the dairy effluent. Three types of exemplary treatments were performed to liberate P from the particulates in the dairy effluent, including acidification, citric acid treatment, and ethylenediaminetetraacetic acid (EDTA) treatment.

Acidification. The first type of treatment was acidification of the effluent samples. Acidification was intended to negate the interfering effect of calcium, and to dissolve the P into solution as soluble phosphate ions by protonating the phosphate ions to reduce the phosphate ion concentration. This reduced concentration lowers the calcium-phosphate ionic product below the equilibrium solubility product for calcium phosphates, resulting in dissolution of solid calcium phosphate. Concentrated HCl was added to the effluent samples to depress the pH to various targeted degrees, from its original pH 7.8 to 3.8, to dissolve the calcium-phosphate solids. The samples were then centrifuged at about 10,000 rpm for 10 min. The TP, ortho-phosphate (OP), and calcium amounts in the supernatant were determined for calculation of concentrations in molarity (mmol/L) of P and calcium in solution.

Citric acid treatment. The second type of treatment was to add citric acid (formula I) to the effluent.

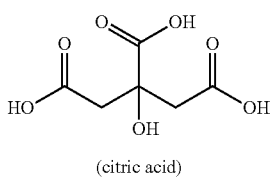

(citric acid)

Rather than dissolving the calcium and P in solution as in the acidification process, the citric acid study sought to sequester calcium because citric acid has a strong bonding interaction with calcium, as indicated by the stability constant of calcium-citrate of pK=3.5. The citrate would competitively bind calcium to form a calcium-citrate complex that has moderate solubility in water (about 0.1 g per 100 g water). Therefore the P is released from calcium-phosphorus particles into solution as phosphate ions. Citric acids, with final concentrations from 0 to 120 mmol/L in the solutions, were added to the effluent samples. The samples were then shaken to ensure complete reaction between citric acid and calcium-phosphorus, at about 120 rpm for 1 hour, and further centrifuged at about 10,000 rpm for 10 min. The TP amounts in the supernatant were analyzed. An additional procedure was performed after the citric acid addition and centrifuging, and before the analysis. Specifically, the pH in the effluent was increased to 8.5 to encourage formation of phosphate solids and then centrifuged again prior to analysis.

EDTA treatment. The third treatment was to add a chelating agent, EDTA (formula II), at concentration levels from 0 to 70 mmol/L in solution.

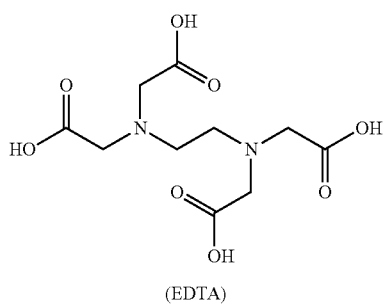

(EDTA)

The EDTA treatment procedure was similar to that of the citric acid. The TP, OP, calcium, and magnesium amounts in the supernatants were analyzed.

In certain aspects oxalic acid (formula III) is used as a $Ca^{2+}$ ion chelating agent (e.g., see Table 1 below).

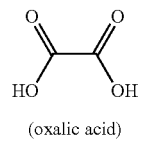

(oxalic acid)

Struvite formation. At higher EDTA levels in the above experiments, it was anticipated that magnesium would also be tied up and unable to contribute to precipitating the P as struvite. Magnesium chloride at different levels from 0 to 155.4 mmol/L was therefore added to increase the $Mg^{2+}$ ion molarity at two EDTA levels of 40 and 70 mmol/L. The TP concentrations in solutions were analyzed after centrifugation. The resultant concentrations of TP in solution would be expected to decrease significantly after precipitation of struvite enabled by excess $Mg^{2+}$ ions. In addition, the precipitated solid was collected after centrifugation and subjected to X-ray diffraction (XRD) analysis to verify struvite formation. Experiments were performed in triplicate. The experimental errors were determined (typically less than 10%).

Analytical methods. TP and OP analysis were performed in the Water Quality Lab at Washington State University (WSU) according to Standard Methods (21). The concentrations of calcium and magnesium in the supernatants were determined using an Atomic Absorption Spectrometer (Varian 220). Before the analysis of calcium and magnesium, concentrated HCl was added to the samples to adjust the pH to 1.0-2.0. This adjustment should have solubilized calcium and magnesium into a solution if calcium and magnesium were in a particulate form. XRD analysis was run on an X-Ray Powder Diffractometer (Siemans D500) in the GeoAnalytical Laboratory at Washington State University (WSU). Operation conditions were 35 kV and 30 mA with CuKa radiation. Samples were scanned from 10° to 70° (2-theta) with 0.02 degree and 1.5 sec per step. XRD powder diffraction analysis is a method by which X-rays of a known wavelength are passed through a sample in order to identify the crystal structure such as struvite (23). The wave nature of the X-rays means that they are diffracted by the lattice of the crystal to give a unique pattern of peaks of 'reflections' at differing angles and of different intensity, just as light can be diffracted by a series of suitably spaced lines.

Results:

Table 1 present the results of the oxalic acid experiments, which were conducted for all four combinations of two treatment options: centrifuging or just a short gravity settling for solids removal, and no pre-acidification or pre-acidification to pH 5.0.

As seen in the table, there was little effect when only gravity settling was used and there was no pre-acidification. When pre-acidification was used, however, almost half the calcium was removed by the short gravity settle, consistent with the assumption that calcium oxalate was formed and settled out. When centrifuging was used, most of the calcium was removed regardless of whether the liquid was pre-acidified, even when only 6 mmol/liter (less than the starting molarity of calcium) was added. When oxalic acid was added in molar amount greater than that of calcium, all of the calcium was removed in both the pre-acidified and non-pre-acidified trials. The implication of these results for the present project is that oxalic acid may be an effective calcium-binding reagent also for the Vander Haak's crystallizer feed liquid.

TABLE 1

Ca, Mg, and P in Solution after Oxalic Acid Treatments
On Non-Digested Wastewater from Werkhoven Dairy.

| Treatment Description | Oxalic Acid Added (mmol/L) | Ca (mmol/L) | Mg (mmol/L) | Total P (mmol/L) | OP (mmol/L) |
| --- | --- | --- | --- | --- | --- |
| Raw. Untreated wastewater. | — | 8.0 | 8.5 | 2.2 | 1.4 |
| No pH adjustment or centrifuging. Indicated amount of oxalic acid added, then settled 30 minutes. Liquid, without sediment, analyzed. | 0 | 8.6 | 9.0 | 2.3 | 1.5 |
| | 6 | 8.6 | 8.7 | 2.9 | 2.1 |
| | 18 | 8.8 | 8.6 | 2.4 | 1.6 |
| pH adjustment but no centrifuging. pH reduced to 5.0, then indicated amount of oxalic acid added, then settled 30 min. Liquid, without sediment, analyzed. | 0 | 9.2 | 8.9 | 2.3 | 1.6 |
| | 6 | 8.2 | 8.8 | 2.3 | 1.6 |
| | 18 | 4.7 | 9.0 | 2.4 | 1.6 |
| Centrifuging but no pH adjustment. Indicated amount of oxalic acid added, then centrifuged. Centrate analyzed. | 0 | 4.7 | 7.1 | 1.0 | 0.4 |
| | 6 | 1.3 | 7.4 | 1.6 | 1.4 |
| | 18 | 0 | 7.5 | 1.8 | 1.5 |
| pH adjustment and centrifuging. pH reduced to 5.0, then indicated amount of oxalic acid added, then centrifuged. Centrate analyzed. | 0 | 6.2 | 8.2 | 1.9 | 1.6 |
| | 6 | 2.2 | 8.0 | 1.9 | 1.6 |
| | 18 | 0 | 8.4 | 2.0 | 1.6 |

Liberation of P by Acidification. FIG. 1 presents the results of acidification to dissolve P and $Ca^{2+}$ ion complexes in solution. As shown the FIG. 1, concentrations of $Ca^{2+}$, TP, and OP increased significantly with pH decrease due to acid addition—evidence that the acid indeed released P and $Ca^{2+}$ into the solution. For instance, the concentrations of $Ca^{2+}$, TP, and OP of 1.1, 1.4, and 0.5 mmol/L at original pH 7.8, were increased to 17, 8.0, and 7.4 at pH 3.8, respectively. These results demonstrated that more P was solubilized into solution as pH decreased and that the majority of P must have been in suspended solid form in the original dairy effluent at pH 7.8. The released P as phosphate ions in low pH solution could either form struvite or return back to calcium-phosphate particles when solution pH increases back to original pH (7.8). Both struvite and beta-tricalcium phosphate (BTCP) with their constituent ions are sufficient to exceed their equilibrium solubility products at the pH of 7.8. The BTCP equilibrium competes with that of struvite for released phosphate ions. If the calcium content is so high that the equilibrium moves toward to BTCP, the BTCP will be formed. Struvite could also be formed if high concentrations of constituent ions ($NH_4^+$ and $Mg^{2+}$) of struvite are present in solution, as well as crystal seeds supporting spontaneous formation of new particles.

Figure 2:
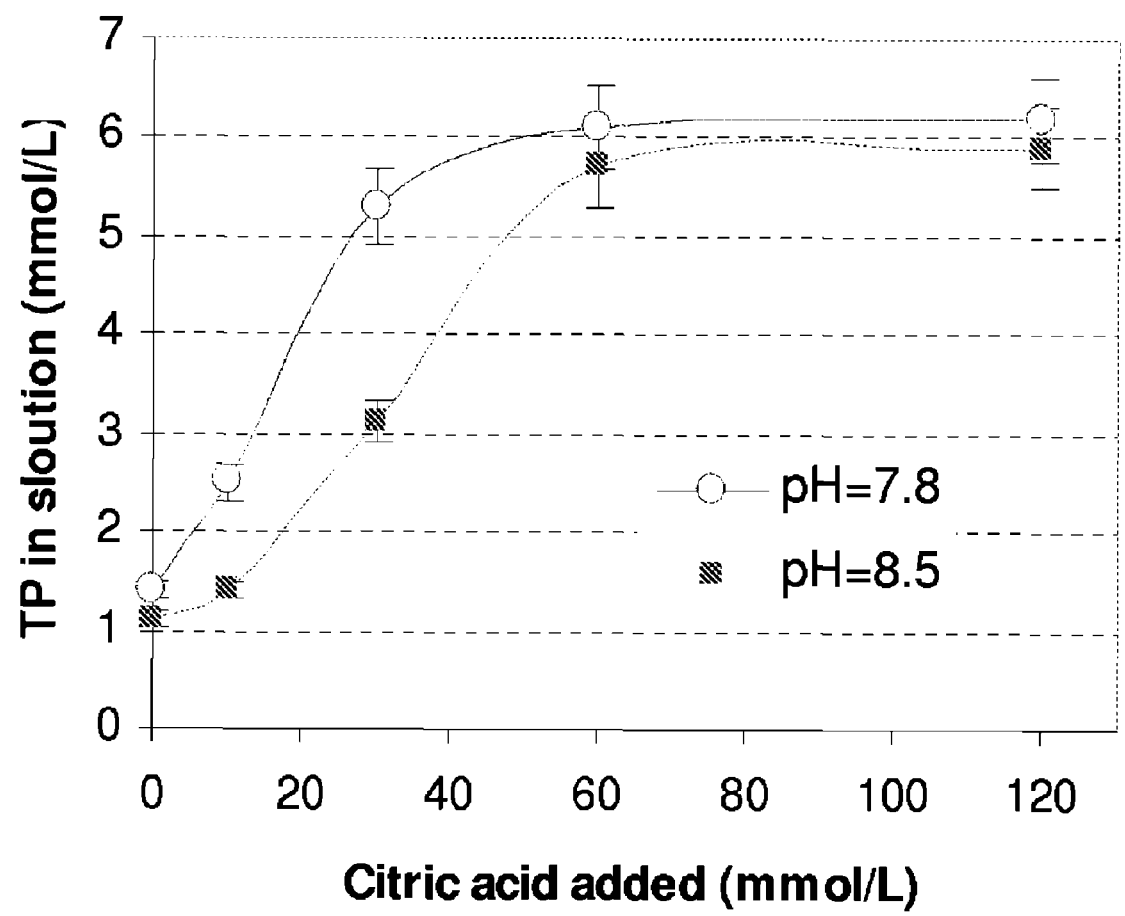
FIG. 2, shows, according to particular exemplary aspects, the phosphorus ("P") concentration in solution after the addition of citric acid under different pH conditions.

Effect of Citric Acid addition on P liberation. FIG. 2 shows the P concentration in solution after the addition of citric acid. The TP concentration increased significantly with increases in citric acid concentration. As shown in FIG. 2, most of the P (>5.7 mmol/L) was freed into solution with 60 mmol/L citric acid in this treatment considering the TP was 6.8 mmol/L in the original effluent. In addition, solution pH increases to 8.5 had no significant influence on the P solubilization. If the increase in dissolved P was due to the pH-depressing effect of citric acid rather than to its sequestering effect, the concentrations would not have remained high when the pH was brought up to 8.5. These results verify Applicants' conception that citric acid can sequester calcium and liberate P from its suspended solid within the test materials.

Figure 3A:
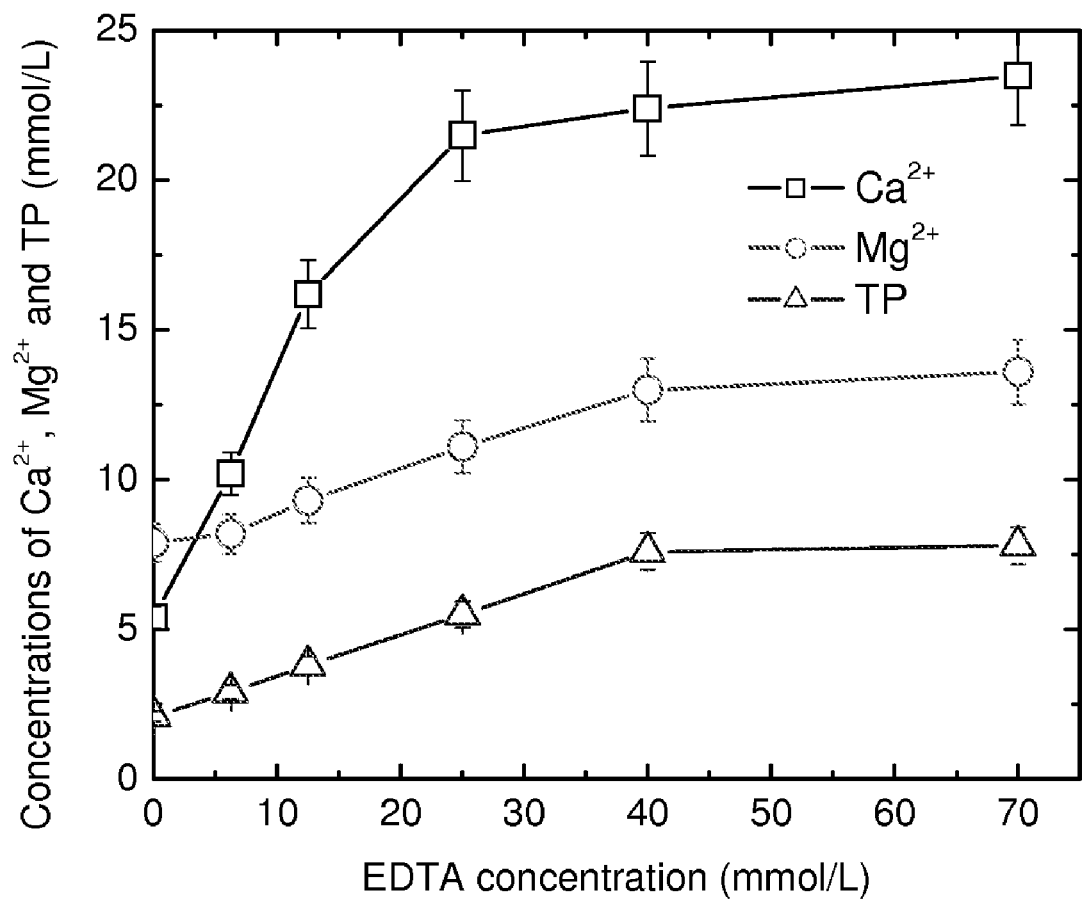
FIG. 3A, shows, according to particular exemplary aspects, phosphorus, calcium, and magnesium in solution after EDTA addition, without pH adjustment, and that EDTA was very effective in liberating calcium-sequestered P into solution.

Effect of EDTA addition on P liberation. Results from addition of EDTA demonstrated that the EDTA was very effective in liberating the calcium-sequestered P into solution (FIG. 3A). As the amount of EDTA addition increased, more calcium and P were in solution. This is consistent with the hypothesis that EDTA tied up calcium, releasing both calcium and the P that had been calcium-bound in the solids into solution. For instance, at zero addition, most of the calcium and P were present in the solids, as expected, leaving little in the final treated liquid. However, with 40 mmol/L EDTA addition, slightly exceeding the sum of the calcium and magnesium molarity in the raw sample, most of the calcium (93%) was released. The release profiles of P and magnesium were similar, but magnesium lagged behind a little. This lag can be explained by the fact that EDTA preferentially binds to calcium first. Since the stability of the $[EDTA-Ca]^{2-}$ complex is two orders of magnitude greater than that of $[EDTA-Mg]^{2-}$ complex, EDTA binds magnesium only when almost all the calcium has been bound. Therefore, the P was released into solution from calcium solids.

Figure 3B:
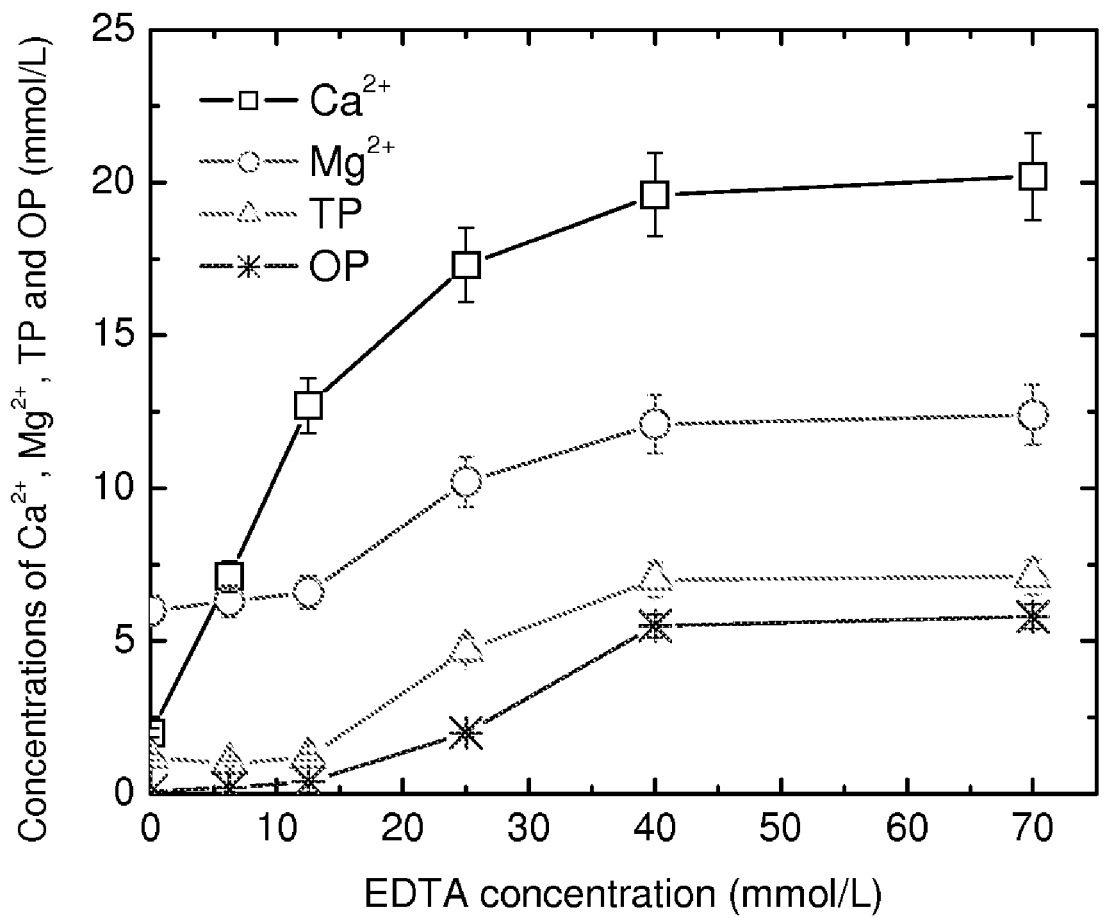
FIG. 3B, shows, according to particular exemplary aspects, phosphorus, calcium, and magnesium in solution after EDTA addition, with subsequent adjustment to pH=8.5.

In addition, the results (FIG. 3B) of the additional procedure performed of increasing pH to 8.5 were similar to those without pH adjustment shown in FIG. 3A. As expected, calcium, magnesium, and P in both TP and OP were released into solution. For instance, at the high levels of EDTA (>40 mmol/L), the calcium binding effect with the EDTA blocked the ability of calcium to combine with P to form solids, even with the pH at 8.5, leaving most of the calcium and phosphorus in solution. Note, however, that release of P (TP or OP) did not occur at this pH until EDTA addition exceeded the Ca molarity. This effect was assumed to result from the tendency of EDTA to bind calcium first, leaving any magnesium in solution available to precipitate P as struvite as P is released from the calcium phosphate solid by the EDTA. The lower pH (resulting from EDTA addition) of the solution in FIG. 3(a) prevented struvite from forming and thus permitted the P liberated from the calcium phosphate solids to remain in solution.

EDTA is a chelating agent for calcium and magnesium, with high stability constants to $[EDTA-Ca]^{2-}$ and $[EDTA-Mg]^{2-}$ of $10^{+10.7}$ and $10^{+8.7}$, respectively. Thus EDTA exhibits stronger binding to both calcium and magnesium than citric acid does. Both calcium-EDTA complex and released P would dissolve in solution, resulting in increased calcium and P concentrations in solution after EDTA addition. For example, a typical digester effluent would have pH 7.8, 7 mmol/liter OP (see FIG. 1), and 18 mmol/liter calcium. The $pK_a$ of $H_2PO_4^{1-}$ is 7.2 and that of $HPO_4^{2-}$ is 12.3, thus the molarity of phosphate ($PO_4^{3-}$) can be calculated as $5.0 \times 10^{-8}$ if all were dissolved in the liquid. Menar and Jenkins (22) found tricalcium phosphate, or $Ca_3(PO_4)_2$, with a solubility product of $10^{-24}$ to be the controlling calcium phosphate in wastewaters containing magnesium. The solution product would be $(1.8 \times 10^{-2})^3 \times (5.0 \times 10^{-8})^2$, or $1.45 \times 10^{-20}$, far exceeding the tricalcium phosphate solubility product, resulting in precipitation of most of the phosphate as tricalcium phosphate. But even if the phosphate concentration was not reduced by tricalcium phosphate precipitation, the lowest calcium molarity would be $7.3 \times 10^{-4}$. Any higher concentration of calcium would exceed the tricalcium phosphate solubility product. EDTA, however, could lower the calcium concentration by sequestering it. By applying the EDTA-Ca stability constant of $10^{10.7}$, adding an amount of EDTA equal in moles to the total calcium concentration (18 mmol/liter) can result in a free calcium molarity of $6 \times 10^{-7}$ as calculated, less than one-thousandth the lowest concentration for which phosphate was calculated to be able to obtain the free calcium. The EDTA, therefore, removes free calcium from solution, resulting in dissolution of tricalcium phosphate to re-establish the equilibrium between phosphate and tricalcium phosphate, thus also liberating phosphate.

EDTA in high concentration, however, can also bind with magnesium as a $[EDTA-Mg]^{2-}$ complex, resulting in the reduction of free $Mg^{2+}$ ions available for struvite formation. At high EDTA levels, then, magnesium is bound up and unable to precipitate the P as struvite. More complete P liberation was in fact seen at the high EDTA levels shown in FIG. 3A and FIG. 3B.

Figure 4:
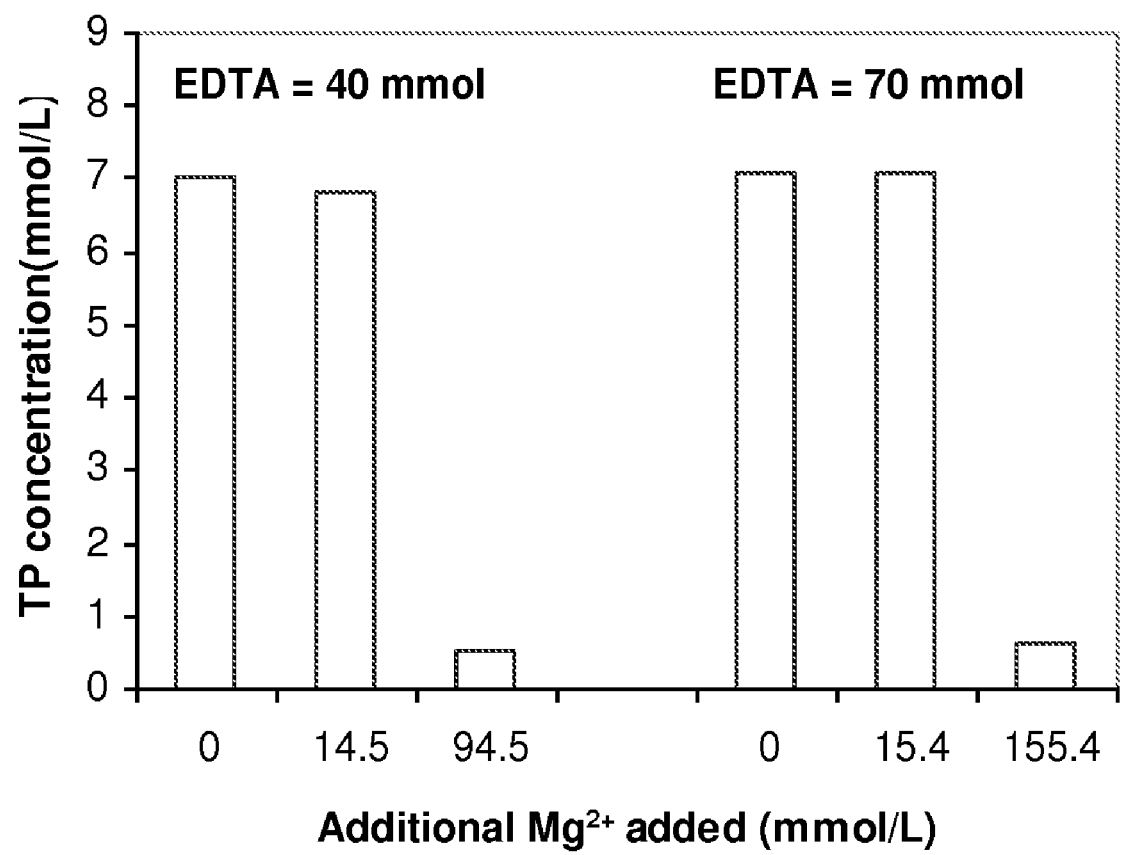
FIG. 4, shows, according to particular exemplary aspects, phosphorus in solution after both EDTA and additional $Mg^{2+}$ ions added (pH=8.5); that is, the results of additional $Mg^{2+}$ ions added at different levels at EDTA concentrations of 40 and 70 mmol/L.

Struvite formation also requires free $Mg^{2+}$ ions as they are constituent ions of struvite. To verify this with the exemplary dairy effluent, magnesium chloride was added to increase the magnesium ion molarity at different levels. At sufficient levels of $Mg^{2+}$ ions, all EDTA would bind up with the $Mg^{2+}$ ions. Therefore chemical equilibrium leads to forming struvite, not BCTP, because of high concentrations of $Mg^{2+}$, $PO_4^{3-}$ ions available with $NH_4^+$ ions present in solution. If this hypothesis were true, the P concentration would be significantly decreased after struvite formation. FIG. 4 shows the results of additional $Mg^{2+}$ ions added at different levels at EDTA concentrations of 40 and 70 mmol/L. These results indeed verified the above hypothesis. The P concentration in solution had no significant change at $Mg^{2+}$ ion concentration of 14.5 mmol/L in comparison with that of zero $Mg^{2+}$ ions addition at EDTA concentration of 40 mmol/L. The results indicated that EDTA tied up all $Mg^{2+}$ ions, leaving no free $Mg^{2+}$ ions for struvite reaction. However, when the $Mg^{2+}$ ion concentration increased to 94.5 mmol/L, much higher than EDTA of 40 mmol/L, the excess $Mg^{2+}$ ions combined with the P to form struvite precipitates, resulting in the sharp reduction of P concentration in solution. Similar results were obtained at an even higher EDTA level of 70 mmol/L. The resulting concentrations of P are consistent with precipitation of struvite enabled by excess $Mg^{2+}$ ions.

Figure 5:
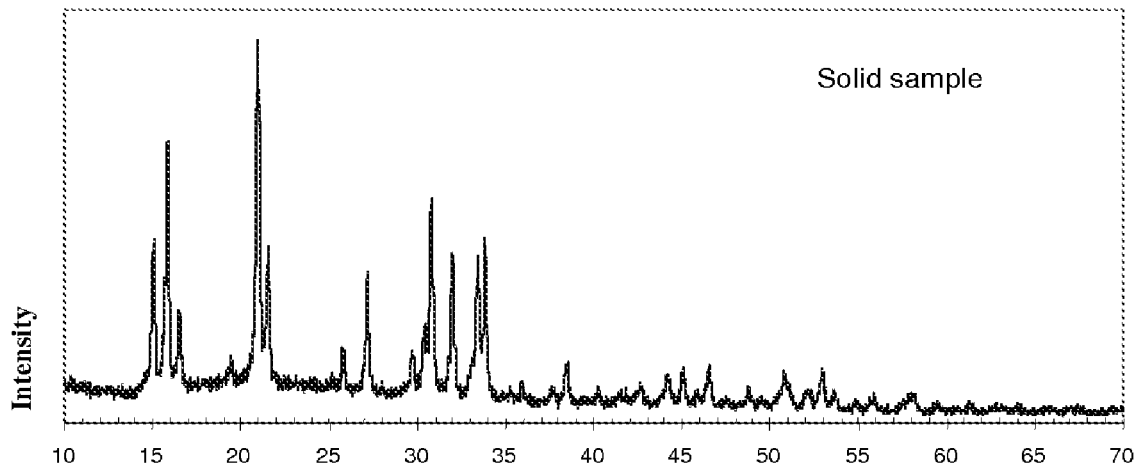
FIG. 5 shows, according to particular exemplary aspects, X-Ray diffraction pattern from solid product compared with standard struvite, showing same pattern confirming production of struvite according to the present inventive methods.

Struvite Precipitation. FIG. 5 shows the XRD result of the precipitated solid, compared with that of standard struvite. It was clear that the precipitated solid's pattern matched the unique pattern of standard struvite (23) for both angles (diffraction angles 2θ and intensities). Therefore, according to particular aspects, struvite was obtained, consistent with the conceived mechanism.

The results of this Example 1, confirmed that P exists largely in the form of calcium-sequestered particulates in the AD-digested dairy wastewater. According to preferred aspects, the P is liberated into solution as phosphate ions prior to struvite precipitation. The practical implication of this study is that for the first time, the particulate P in effluents, etc. comprising calcium-sequenstered P can be practically and efficiently converted into phosphate ions to be available for struvite formation. Struvite is preferred to the original calcium phosphate because struvite is more crystalline and thus better suited to be removed in a crystallizer, and struvite is a better fertilizer than calcium phosphate. The results also provide applications in P removal technologies for dairy wastewater management, and for broader management of many other effluent streams, wastewaters, materials. etc., characterized as comprising calcium-sequestered P.

Additional Exemplary Chelating Agents:

The use of citrate, EDTA and oxalate as chelating agents in the present methods was discussed above. It will be obvious to those of skill in the art that a wide variety of calcium chelating agents can be applied with varying levels of efficiency provided that they sufficiently chelate $Ca^{++}$ without sequestering $Mg^{++}$ and or $NH^+$ to an extent that interferes with struvite formation. For example, other art-recognized chelating agents include, but are not limited to alpha lipoic acid (ALA), aminophenoxyethane-tetraacetic acid (BAPTA), defarasirox, deferoxamine, diethylene triamine pentaacetic acid (DTPA), dimercaprol (BAL), dimercapto-propane sulfonate (DMPS), ethylenediamine tetraacetic acid (calcium disodium versante) ($CaNa_2$-EDTA), ethylene glycol tetraacetic acid (EGTA), D-penicillamine, 2-{(carboxymethyl)[2-trimethylamino)ethyl]amino}acetic acid, and including salts (e.g. sodium salts) of such agents as well as the free acids are considered to equally effective in view of the ready mobility of the sodium ion in dissociating in aqueous solution.

Another chelating agent is a soluble polydentate (e.g. at least tridentate ligand), which may be an organic chelating compound modified by addition of or substitution with a solubilizing group, e.g. a quaternary ammonium group, which is soluble in acid pH ranges, especially remaining soluble below pH 4.

Chelating groups include, but are not limited to, sulphonic and carboxylic groups, and the latter are preferred for purification of calcium sulphate.

Preferred chelating agents include the following: 4-(carboxymethyl)-2-(trimethylamino)pentane-1,5-dicarboxylic acid, 2-(carboxymethyl)-2-(trimethylamino)butane-1,4,dicarboxylic acid, 2-(carboxymethyl)-3-(trimethylamino)butane-1,4-dicarboxylic acid, and the like.

Alginic acid is a polysaccharide made up of D-mannuronic acid and L-guluronic acid residues. It is produced from brown seaweeds (Phaeophycae) through an extraction process. Depending on the particular species of seaweed and the method used in extraction, alginates of various molecular weights can be prepared. The higher molecular weight alginates form viscous solutions in water at relatively low concentrations, e.g., 1% by weight, and hence have found utility as viscosity adjusting agents in foods and dentifrices.

Flocculating agents. According to additional aspects, flocculation can be use to affect P reduction in effluents. In particular aspects, PEI polymers can be used as flocculants. Polyethylenimine (PEI) is a group of branched polymers with different molecular weights and positive charges; for example, Sk-2000K (Polyethylenimine (Lupasol® SK)), PEI-750k (Polyethylenimine solution), SC-110k (Ethoxylated Polyethylenimine (Lupasol® SC-61B)), Eth-70k (Polyethylenimine, 80% ethoxylated solution. Other flocculants include polyacrylamides (PAM), and cationic, anionic, and nonionic polymers. Coagulants may also be used as flocculating agents, and include but are not limited to inorganic compounds, such as aluminum sulfate (alum), ferric sulfate, and lime ($Ca(OH)_2$).

According to particular aspects, both P and Ca can be reduced by flocculation to some extent, and the P can be released into water to provide for formation of struvite through precipitation.

EXAMPLE 2

(Phosphorus was Removed by Struvite Crystallization in Various Livestock Wastewaters)

Overview. Large dairies and swine farms using flush systems for animal waste management face increasing restrictions on over-application of phosphorus to cropland. The wastewater that the flush systems produce contains phosphorus, and is stored in lagoons for recycling in the flush system and for irrigation onto the cropland. Dairy wastewater in some cases is treated in digesters in concentrated form to produce biogas and reduce odor before being irrigated onto cropland. Phosphorus, is sometimes present in the wastewater at concentrations high enough to exceed the crops' ability to take it up. In such cases, phosphorus accumulates in soil and may eventually saturate it. Concerns have arisen that phosphorus in saturated soils may move into surface waters, where it could cause environmental harm. As a result, the swine and dairy industries are considering means for reducing the phosphorus content of their wastewaters.

Applicants have proposed struvite crystallization for reducing the phosphorus content. The current study compares characteristics of three different wastewaters and relates them to differing phosphorus removal results achieved in applying a cone-shaped fluidized-bed struvite crystallizer system to the wastewaters. The three wastewaters were (1) swine lagoon wastewater; (2) dairy lagoon wastewater; and (3) dairy digester effluent.

The swine lagoon wastewater contained 0.2% or less total solids, less than 200 parts per million (ppm) calcium, 20-70 ppm magnesium, and 50-120 ppm total phosphorus. The crystallizer system achieved greater than 70% removal of phosphorus in this wastewater. The dairy lagoon wastewater was higher in total solids (0.4% or more), calcium (300 ppm or more), and magnesium (100 ppm or more), but total phosphorus was in the same range as the swine wastewater. Phosphorus removal at first was near zero. The poorer performance was attributed to calcium binding of phosphorus and carry-over of struvite product in the treated wastewater due to the higher solids content (and thus viscosity) of the wastewater. System modifications to address these aspects increased phosphorus removal to 50%. The dairy digester effluent contained even greater amounts of solids, calcium, and magnesium, and phosphorus content was greater also. Phosphorus removal typically did not exceed about 25%.

Experiments and Results:

A cone-shaped fluidized bed struvite crystallizer developed for reducing phosphorus content of swine wastewater, was tested in that application and also in dairy wastewater. Two types of dairy wastewater were tested: (1) lagoon water; and (2) digester effluent. Though the inflow to the digester contained primarily dairy waste, it also contained a smaller amount of fish and poultry processing waste.

Figure 6:
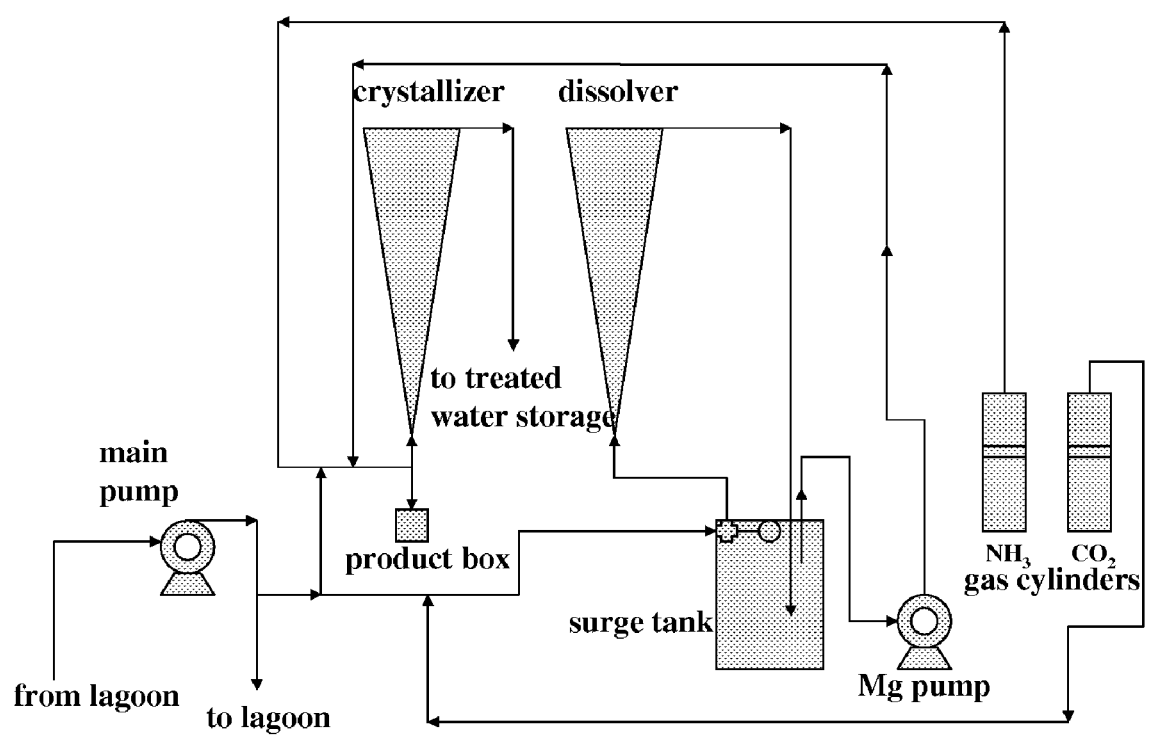
FIG. 6 shows a schematic diagram of crystallizer system at swine farm in North Carolina.

Swine Wastewater. A crystallizer unit was set assembled to accommodate the average estimated flow (443 L/hour) for irrigation of lagoon liquid from a feeding operation consisting of 1,000 swine averaging 68 kg. It was set up at the edge of the primary lagoon at the North Carolina State University swine research farm near Raleigh, N.C. The main part of the unit was a cone containing a granular struvite bed, fluidized by wastewater entering the cone at the bottom and overflowing at its top. The cone measured 152.4 cm in height with diameters of 3.8 cm at the bottom and 25.4 cm at the top. A ¾-horsepower Teel model 2P899A shallow well jet pump drew liquid from the lagoon and injected it into a manifold at the cone bottom. Ammonia and magnesium (Mg) solution were also injected into the manifold. Ammonia flowed in gaseous form from pressurized cylinders. Mg solution was moved from a surge tank to the manifold by an Idex model 120-000-110 variable speed gear pump. A cone-shaped rubber plug with outer diameter matched to the inner cone diameter functioned as a check valve at the cone bottom, and could be raised or removed using a steel stem extending up to the top of the cone. The set-up is illustrated in FIG. 6. For the work described here, the magnesium dissolver and carbon dioxide-related parts referred to in FIG. 6 were not used, because Mg addition was in the form of magnesium chloride solution. The lagoon water entering the system contained 82-93 part per million (ppm) total phosphorus (TP), of which 38-46 ppm was orthophosphate phosphorus (OP). Magnesium and total ammoniacal nitrogen (TAN) were 53-66 ppm and 176-180 ppm, respectively. The pH ranged from 7.69 to 7.72.

A randomized complete block experiment was conducted with the system. There were three blocks, each consisting of the eighteen conditions resulting from factorial-style application of two flow rates (341 and 568 liters/hour), three Mg addition levels (zero, 30, and 60 ppm), and three ammonia addition levels (none, increase of 0.5 pH points, and increase of 1.0 pH points). Raw and treated samples were analyzed for TP and OP. TABLE 2 presents the average OP and TP reductions achieved at each condition. Phosphorus removal was good when both ammonia and Mg were added, ranging from 73% to 82% for OP and 63% to 80% for TP.

TABLE 2

Swine lagoon results.

| Liquid flow rate | | 341 L/hour | | | 568 L/hour | |
|---|---|---|---|---|---|---|
| Mg addition rate | 0 ppm | 30 ppm | 60 ppm | 0 ppm | 30 ppm | 60 ppm |
| ORTHOPHOSHATE PHOSPHORUS (OP) REMOVAL | | | | | | |
| pH rise achieved none | 13% | 23% | 24% | 13% | 22% | 27% |
| 0.5 point | 61% | 73% | 82% | 56% | 70% | 78% |
| 1.0 point | 68% | 78% | 76% | 64% | 81% | 80% |
| TOTAL PHOSPHORUS (TP) REMOVAL: | | | | | | |
| pH rise achieved none | 0% | 14% | 23% | 7% | 12% | 14% |
| 0.5 point | 59% | 70% | 69% | 41% | 63% | 67% |
| 1.0 point | 64% | 80% | 72% | 63% | 75% | 73% |

Dairy Lagoon Water. For treating dairy lagoon water, a set-up similar to that used for the swine lagoon water was assembled at a 700-head dairy in Snohomish County in western Washington. The unit comprised a set-up for treating lagoon water at a 700-cow dairy in western Washington. The main crystallizer cone was at center, with product collector underneath and overflow hose carrying treated wastewater from top right of cone down into 50-gallon catch tank. Catch tank overflows through hose at bottom right. Large black tank at left was a 3,000-gallon pretreatment tank, from which the main pump (to left of foot of cone support frame) draws. At rear (behind cone, near back border of concrete pad) are plywood sheets used for air-drying of product. To accommodate the greater viscosity of the dairy lagoon water, the cone in the dairy unit was 1.5 times larger in each dimension than the cone in the swine unit. The larger diameter aimed to sary and preliminary tests showed no that Mg addition did not affect performance. Therefore, Mg addition was suspended.

Total phosphorus removal during operation of this system without acid pre-treatment was generally poor, not exceeding 25%. With the pre-treatment, performance improved to around 50%. A randomized complete block experiment, testing three cone pH conditions (6.75, 7.25, and 7.75) in three blocks, was conducted. The flow rate was set at the highest flow (284 liters/hour) that could be used without sweeping bed material out with the treated liquid.

The results, displayed in TABLE 3, showed phosphorus removal lower than that achieved in swine lagoon water but, at pH 7.75, sufficient to be of use in this application.

TABLE 3

Dairy lagoon results (284 liters/hour)

| Ammonia level: | BLOCK 1: TP in raw = 68.5 ppm | | BLOCK 2 TP in raw = 71.1 ppm | | BLOCK 3 TP in raw = 74.9 ppm | | MEAN |
| --- | --- | --- | --- | --- | --- | --- | --- |
| | Random order | TP removal | Random order | TP removal | Random order | TP removal | TP REMOVAL |
| To pH = 6.75 | 2 | 19% | 3 | 15% | 1 | 7% | 14% |
| To pH = 7.25 | 1 | 44% | 2 | 41% | 3 | 42% | 42% |
| To pH = 7.75 | 3 | 47% | 1 | 50% | 2 | 50% | 49% | produce a slower up-flow at a given volumetric throughput, thus reducing the tendency for the more viscous liquid to sweep bed particles over with the treated wastewater. Lagoon water flowed by gravity into a 15,000-liter surge tank from a flush tank that was refilled with lagoon water several times per day after flushing of the animal enclosure areas. From the surge tank, the wastewater was pumped by a Micropump model GL-H25-JFS.E magnetic gear pump with variable speed controller to the inlet manifold under the cone. The gravity flow, surge tank, and gear pump were used for the dairy lagoon water, as opposed to the jet pump drawing directly from the lagoon in the swine farm set-up, because preliminary tests at the dairy using the swine farm set-up suffered from unsteady flow brought on by cavitation and loss of prime in the jet pump.

The preliminary tests at the dairy also revealed the need to reduce the pH of the lagoon water before feeding it to the cone. The TP concentration, OP concentration, and pH (50-111 ppm, 28-52 ppm, and 7.7-8.0, respectively) were similar to those in the swine lagoon water. However, Mg ranged from 194 to 434 ppm, several times that of the swine lagoon water. In addition, calcium (Ca) in the dairy lagoon water ranged from 252 to 484 ppm. The swine wastewater was not analyzed for Ca during the period of crystallizer operation, but data from other swine lagoons in the area (Barker et al) show an average of 122 ppm Ca, roughly one-third the average in the dairy lagoon water. The TAN concentrations (614-1165 ppm) also were higher.

Thermodynamic calculations using these conditions indicated that, unlike the swine lagoon water, the dairy lagoon water contained sufficient Mg, Ca, TAN, and P to supersaturate it with respect to struvite and/or beta-tricalcium phosphate (BTCP) and/or to contain these solids in fine suspended form. To dissolve any such solids and thus free their phosphorus to make it available for crystallization, acid was blended into the lagoon water in the surge tank to lower its pH to 5.0 prior to feeding it into the cone. Because Mg content of the lagoon water was high, no Mg addition appeared neces- Dairy Digester Effluent. For treating digester effluent, the same set-up was used as that described above for dairy lagoon water, except a smaller cone (152.4 cm in height with diameters of 3.8 cm at the bottom and 25.4 cm at the top) was used. The smaller cone was used to control trucking costs resulting from the need to transport liquid to the testing site from the Vander Haak dairy (Whatcom County, Washington), where operating the crystallizer is impractical. The smaller cone permitted use of a lower throughput rate and therefore less trucking of effluent. The digester is fed mostly waste from a local cluster of dairies, but waste from nearby fish and poultry processing plants is mixed in. The digester effluent used in the crystallizer tests was higher in solids and nutrient content than the swine and dairy lagoon water. The TP content ranged from 238 to 323 ppm, of which OP accounted for 106 to 231 ppm. The TAN ranged from 2120 to 3426 ppm, and Mg and Ca were 311-504 ppm and 662-1271 ppm, respectively. Because the higher concentrations permit suspended Ca and Mg phosphates down to a lower pH, the raw liquid was acidified in the surge tank down to as low a pH as 4.0.

Performance was somewhat inconsistent. Bed particles could be seen in liquid samples drawn from the exiting liquid overflow from the cone, even when the liquid flow rate was reduced to as low as 21 liters per hour. Growth of the bed and phosphorus removal during some periods were negative, presumably due to the loss of bed particles with the exiting liquid. A controlled test was performed with the flow rate at 57 liters/hour, with six conditions resulting from two cone pH levels (6.5 and 7.5) and acidification of the raw to three pH levels (4, 5, and 6) in the surge tank. When treated liquid was sampled, part of it was set aside to settle one day, and a sample of the settled liquid taken to analyze along with the unsettled sample. This procedure aimed to show the effect of removal of the bed particles observed in the treated liquid exiting the cone.

TABLE 4 shows results. The pH to which the raw liquid was acidified had no obvious effect. The cone pH appeared more influential, with better removals at the higher pH. At a cone pH of 6.5, TP removal was averaged only 2% without settling, and 18% with settling. With the cone pH at 7.5, removal was somewhat better, but still averaged only 16% without settling and 35% with settling.

relationship is consistent with Applicants' hypothesis that calcium was interfering by tying up the phosphorus as a fine

TABLE 4

Dairy digester effluent results (57 liters/hour)

| | | CONE pH | | | | | |
|---|---|---|---|---|---|---|---|
| | | 6.5 | | | 7.5 | | |
| RAW pH | SAMPLE | TP (ppm) | OP (ppm) | % TP reduction | TP (ppm) | OP (ppm) | % TP reduction |
| 4 | Raw | 261 | 222 | — | 268 | 221 | — |
| | Treated | 251 | 120 | 4 | 207 | 100 | 23 |
| | Settled | 196 | 113 | 25 | 178 | 106 | 34 |
| 5 | Raw | 258 | 219 | — | 261 | 224 | — |
| | Treated | 260 | 146 | (1) | 254 | 78 | 3 |
| | Settled | 231 | 110 | 10 | 151 | 80 | 42 |
| 6 | Raw | 292 | 159 | — | 291 | 155 | — |
| | Treated | 281 | 144 | 4 | 231 | 101 | 21 |
| | Settled | 238 | 129 | 18 | 204 | 100 | 30 |

Discussion. The trend in performance among the three wastewater applications of the systems was roughly the inverse of the trend in visually observed "thickness," or viscosity, of the wastewaters. No measurements of viscosity were available other than the subjective visual observations. Nevertheless, the effect of the wastewaters' thickness on performance appears significant given the fact that bed particles could be observed in the cone overflow and performance deteriorated when operating the system at higher flow rates (over 284 liters/hour) on dairy lagoon water, and that particles were observed and performance was poor at all flow rates when using digester effluent.

The trend in performance was also roughly the inverse of the trend in the calcium content of the wastewaters. This suspended solid, unavailable for struvite crystallization. Consistent with this hypothesis was the fact that, as mentioned above, performance with dairy lagoon water improved after acidifying it sufficiently to dissolve BTCP.

To further test the calcium interference hypothesis, experiments were conducted in which EDTA (ethylenediaminetetraacetic acid) was added to crystallizer feed liquid brought from the digester site, thus bonding with the calcium and liberating the phosphorus if the hypothesis was correct. The EDTA was very successful in liberating phosphorus into solution. TABLE 5 presents results from four kinds of EDTA treatments.

TABLE 4

Ca, Mg, and P in Solution after EDTA and Magnesium Chloride Treatments

| Treatment Description | Reagent Added (mmol/L) | | Chemical Analysis of Resulting Liquid | | | |
|---|---|---|---|---|---|---|
| | EDTA | Magnesium chloride | Ca (mmol/L) | Mg (mmol/L) | Total P (mmol/L) | OP (mmol/L) |
| None: Raw, untreated crystallizer feed | — | — | 24 | 13.6 | 8.6 | — |
| Treatment A: Indicated amount of EDTA added, sample shaken 1 hour, then centrifuged. TP analyzed. Centrate filtered through 0.45 micron medium and Ca, Mg, OP analyzed. | 0 | — | 5.4 | 7.9 | 2.1 | 0.01 |
| | 6.25 | — | 10.2 | 8.2 | 2.9 | — |
| | 12.5 | — | 16.2 | 9.3 | 3.8 | — |
| | 25 | — | 21.5 | 11.1 | 5.5 | — |
| | 40 | — | 22.4 | 13 | 7.6 | — |
| | 70 | — | 23.5 | 13.6 | 7.8 | — |
| Treatment N: Indicated amount of EDTA added, sample shaken 1 hour, then centrifuged. Centrate adjusted to pH 8.5 with ammonium hydroxide, aged overnight, and TP analyzed. Centrate filtered through 0.45 micron medium and Ca, Mg, OP analyzed. | 0 | — | 4.8 | 7.4 | 2.0 | — |
| | 6.25 | — | 9.4 | 7.6 | 2.3 | — |
| | 12.5 | — | 14.2 | 8.7 | 3.5 | — |
| | 25 | — | 20.8 | 11.0 | 5.4 | — |
| | 40 | — | 20.9 | 13.0 | 7.3 | — |
| | 70 | — | 21.6 | 13.2 | 7.7 | — |
| Treatment B: Indicated amount of EDTA added, sample shaken 1 hour, then centrifuged. Centrate adjusted to pH 8.5 with ammonium hydroxide, then centrifuged again and TP analyzed. Centrate filtered through 0.45 micron medium and Ca, Mg, OP analyzed. | 0 | — | 2.0 | 6.0 | 1.2 | 0.3 |
| | 6.25 | — | 7.1 | 6.3 | 1.0 | 0.2 |
| | 12.5 | — | 12.7 | 6.6 | 1.2 | 0.4 |
| | 25 | — | 17.3 | 10.2 | 4.7 | 2.0 |
| | 40 | — | 19.6 | 12.1 | 7.0 | 5.5 |
| | 70 | — | 20.2 | 12.4 | 7.1 | 5.8 |
| Treatment M: Indicated amount of magnesium chloride added, followed by treatment B. | 0 | 2.4 | — | — | 0.6 | — |
| | 6.25 | 2.0 | — | — | 1.2 | — |
| | 12.5 | 2.4 | — | — | 1.1 | — |

TABLE 4-continued

Ca, Mg, and P in Solution after EDTA and Magnesium Chloride Treatments

| Treatment Description | Reagent Added (mmol/L) | | Chemical Analysis of Resulting Liquid | | | |
|---|---|---|---|---|---|---|
| | EDTA | Magnesium chloride | Ca (mmol/L) | Mg (mmol/L) | Total P (mmol/L) | OP (mmol/L) |
| | 25 | 9.4 | — | — | 1.1 | — |
| | 40 | 14.5 | — | — | 6.8 | — |
| | 70 | 15.4 | — | — | 7.1 | — |
| Treatment E: Indicated amount of magnesium chloride added, followed by treatment B. | 40 | 94.5 | — | — | 0.5 | — |
| | 70 | 155.4 | — | — | 0.6 | — |

In the first treatment type (treatment A), EDTA was mixed into the wastewater in amounts varying from zero to 70 mmol/liter, the solids removed by centrifuging, and the remaining liquid analyzed. At zero addition, most of the calcium and phosphorus were removed in the solids, as expected, leaving little in the final treated liquid. As the addition amount increased, less calcium and phosphorus removed, consistent with the hypothesis that EDTA tied up calcium, releasing into solution both it and the phosphorus that had been calcium-bound in the solids. At 40 mmol/liter EDTA addition, slightly exceeding the sum of the calcium and magnesium molarity in the raw sample, most of the calcium was released. The profile of phosphorus and magnesium release was similar, but lagged behind a little. The lag can be explained by the fact that EDTA preferentially binds to calcium first, then to magnesium only when almost all the calcium has been bound. Therefore, as phosphorus is released from calcium, it can then react with magnesium and ammonium to form struvite, which will be removed with the solids. Increasing EDTA concentration can then bind to magnesium in the struvite, thus releasing it and phosphorus from the struvite.

In the second treatment type (treatment N), an additional procedure was added after the EDTA addition and centrifuging, and before the analysis. Specifically, the pH was brought up to 8.5 to encourage formation of phosphate solids and then aged overnight to allow any thus-formed solids to settle out before analysis. Results were similar to those from treatment type A except that, as expected, the amounts of calcium, magnesium and phosphorus released in the liquid fell somewhat short of those observed at corresponding EDTA addition levels in A.

The third treatment type (treatment B) was the same as N except that, after buffering to pH 8.5, the liquid was centrifuged again rather than simply aged overnight. Centrifuging removes solids that are too fine to be removed by gravity settling during aging. This treatment reduced the calcium, magnesium, and phosphorus more than treatment N did, indicating some of the solids formed by buffering to pH 8.5 were too fine to settle by gravity. The effects of the buffering and second centrifuging were greatest at the lower EDTA addition levels. At the highest levels, the calcium binding effect of the EDTA blocked the ability of calcium to combine with phosphorus to form solids, even with the pH at 8.5, leaving most of the calcium and phosphorus in solution.

In the sample to which 25 mmol/liter EDTA had been added, near-maximum release of phosphorus into solution would have been expected, because that amount of EDTA just exceeded the molarity of calcium and would have displaced all the phosphorus from the calcium-phosphorus solids. It was assumed that, since little of the EDTA remained to bind with magnesium, magnesium was free to form struvite, thereby removing phosphorus from solution just as it was freed from the calcium phosphate solids. At higher EDTA levels, then, the magnesium would have been tied up and unable to precipitate the phosphorus as struvite. More complete phosphorus liberation was in fact seen at the higher EDTA levels.

To test the foregoing assumption, treatment types M and E were conducted. The M treatments were the same as B except that magnesium chloride was added to increase the magnesium molarity by twice the molarity of the phosphorus in solution at each EDTA level in B. If the assumption were true, the phosphorus in solution would remain low even at higher levels of EDTA addition. In M, the phosphorus in solution did decrease sharply at 25 mmol/liter EDTA, consistent with the assumption. At higher EDTA levels than 25 mmol/liter, EDTA concentration appeared sufficient to tie up all magnesium, allowing more phosphorus in solution. In the E treatments, which were conducted only at EDTA levels of 40 and 70 mmol/liter, enough magnesium was added to surpass the EDTA available. The resulting concentrations of phosphorus are consistent with precipitation of struvite enabled by excess magnesium. As another test of the assumption, precipitated solid was collected from the mixture resulting from the 40 mmol/liter EDTA level of treatment E and subjected to X-ray diffraction analysis. The diffraction pattern matched that of struvite, consistent with the assumed mechanism.

The practical implications of the results in TABLE 5 are that: (1) phosphorus, which is tied up mostly as suspended calcium phosphate in the digester effluent, can be freed into solution by sequestering calcium; and (2) the freed phosphorus can be precipitated as struvite by ensuring sufficient magnesium remains present in solution in excess of that tied up by the sequestrant. Struvite is preferred to the original calcium phosphate because it is more crystalline and thus better suited to removal in a crystallizer, and because it functions better as a fertilizer.

In addition to tying up phosphorus, calcium may also degrade crystallizer performance by reacting with carbonate, which is formed from bicarbonate as the pH of the wastewater is boosted upon entering the cone. The resulting calcium carbonate may contaminate the struvite bed particles, reducing their struvite content and available struvite surface to serve as crystallization substrate. The product purity from the three wastewaters followed a trend consistent with this hypothesis. Product from the swine lagoon water contained only 0.13% calcium; that from dairy lagoon water was an order of magnitude higher, at 1.3% calcium; and that from digester effluent was a further order of magnitude higher, at 12.4% to 16.1%.

Conclusion. The crystallizer system shows clear potential as a phosphorus removal means for swine lagoon wastewater and may also be of use in dairy lagoon water, though costs will be higher in that application due to increased costs associated with acid pre-treatment and resulting greater requirements for pH-boosting agent (ammonia or alkali). Alterations in the system to address the higher viscosity of digester effluent will further improve its performance for digester effluent, and alterations to block calcium may improve its performance and economics in both digester effluent and dairy lagoon water.

Literature Cited (1) Driver, J.; Lijmbach, D.; Steen, I. Why recover phosphorus for recycling and how? *Environ. Technol.* 1999, 20, 651-662.

(2) IFA, Fertilizer consumption statistics. International Fertilizer Industry Association, Paris, France, 2002.

(3) Edwards, D. R.; Daniel, T. C. Environmental impacts of on-farm poultry waste disposal—A review. *Bioresour. Technol.* 1992, 41(1), 9-33.

(4) Heathwaite, L.; Sharpley, A.; Gburek, W. A conceptual approach for integrating phosphorus and nitrogen management at watershed scales. *J. Environ. Qual.* 2000, 29(1), 158-166.

(5) Zhang, R. H.; Tao, J.; Dugba, P. N. Evaluation of two-stage anaerobic sequencing batch reactor systems for animal wastewater treatment. *Trans. ASAE* 2000, 43(6), 1795-1801.

(6) Sung, S.; Santha, H. Performance of temperature-phased anaerobic digestion (TPAD) system treating dairy cattle wastes. *Water Res.* 2003, 37(7), 1628-1636.

(7) Liberti, L.; Limoni, N.; Lopez, A.; Passino, R.; Boari, G. The 10 $m^3h^{-1}$ RIM-NUT demonstration plant at West Bari for removing and recovering N and P from wastewater. *Water Res.* 1986, 20(6), 735-739.

(8) Wrigley, T. J.; Webb, K. M.; Venkitachalm, H. A laboratory study of struvite precipitation after anaerobic digestion of piggery wastes. *Bioresour. Technol.* 1992, 41(2), 117-121.

(9) Battistoni, P.; Fava, G.; Pavan, P.; Musacco, A.; Cecchi, F. Phosphate removal in anaerobic liquors by struvite crystallization without addition of chemical: preliminary results. *Water Res.* 1997, 31(11), 2925-2929.

(10) Battistoni P.; Paci B.; Fatone F.; Pavan P. Phosphorus removal from anaerobic supernatants: start-up and steady-state conditions of a fluidized bed reactor full scale plant. *Ind. Eng. Chem. Res.* 2006, 45, 663-669.

(11) Burns, R. T.; Moody, L. B.; Walker, F. R.; Raman, D. R. Laboratory and in situ reductions of soluble phosphorus in swine waste slurries. *Environ. Tech.* 2001, 22(11), 1273-1278.

(12) Jeong, Y. K.; Hwang, S. J. Optimum doses of Mg and P salts for precipitating ammonia into struvite crystals in aerobic composting. *Bioresour. Technol.* 2005, 96, 1-6.

(13) Doyle, J. D.; Parson, S. A. Struvite formation, control and recovery. *Water. Res.* 2002, 36, 3925-3940.

(14) Nelson, N, O.; Mikkelsen, R. E.; Hesterberg, D. L. Struvite precipitation in anaerobic swine lagoon liquid:effect of pH and Mg:P ratio and determination of rate constant. *Bioresour. Technol.* 2003, 89, 229-236.

(15) Corre, K. S. L.; Valsami-Jones, E.; Hobbs, P.; Parson, S. A. Impact of calcium on struvite crystal size, shape and purity. *J. Cryst. Growth* 2005, 283, 514-522.

(16) Adnan, A.; Mavinic, D. S.; Koch, F. A. Pilot-scale study of phosphorus recovery through struvite crystallization—examining the process feasibility. *J. Environ. Eng. Sci.* 2003, 2, 315-324.

(17) Bowers, K. B.; Westerman, P. W. Design of cone shaped fluidized bed struvite crystallizer for phosphorus removal from wastewater. *Trans. ASAE* 2005 (a), 48(3), 1217-1226.

(18) Bowers, K. B.; Westerman, P. W. Performance of cone-shaped fludized bed struvite crystallizer in removing phosphorus from wastewater. *Trans. ASAE* 2005 (b), 48(3), 1227-1234.

(19) Suzuki, K.; Tanaka, Y.; Kuroda, K.; Hanajima, D.; Fukumoto, Y. Recovery of phosphorus from swine wastewater through crystallization. *Bioresour. Technol.* 2005, 96, 1544-1550.

(20) Zhang T.; Bowers, K. E.; Harrison, J. H.; Chen, S. Characterization of Phosphorus in Anaerobically Digested Dairy Effluent and Implications to Phosphorus Removal through Struvite Crystallization. *Bioresour. Technol.* 2006, (Submitted).

(21) APHA. Standard Methods for the Examination of Water and Wastewater. 21st edn, American Public Health Association/American Water Works Association/Water Environment Federation, Washington D.C., USA, 2005.

(22) Menar, A. B.; Jenkins, D. Calcium phosphate precipitation in wastewater treatment. SERL report 72-6, Sanitary Engineering Research Laboratory, University of California, Berkeley, 1972.

(23) Mineral Powder Diffraction File Data Book. JCPDS—International Center for Diffraction Data, PA, USA, Editor-in Chief: William Frank McClune, pp 1127 (File No. 15-762), 1986.

The invention claimed is:

1. A method for recovery of phosphate, in the form of struvite, from a fluid or hydrated magnesium ammonium complex of phosphate, composition, effluent, wastewater or solution having non-struvite calcium-sequestered phosphate, comprising:
   obtaining a fluid composition, effluent, wastewater or solution comprising non-struvite calcium-sequestered phosphate;
   adding to the fluid composition, effluent, wastewater or solution a calcium chelating or sequestration agent suitable to chelate or sequester $Ca^{++}$ ions from the non-struvite calcium-sequestered phosphate to facilitate release of phosphate from the non-struvite calcium-sequestered phosphate; and
   accumulating, facilitated by said $Ca^{++}$ ion capture, the released phosphate into struvite (magnesium ammonium phosphate hexahydrate or $MgNH_4PO_4.6H_2O$), or hydrated magnesium ammonium complex of phosphate, wherein phosphate is redistributed from the non-struvite calcium sequestered phosphate into struvite, and wherein a method for recovery of phosphate, in the form of struvite, or hydrated magnesium ammonium complex of phosphate, from a fluid composition, effluent, wastewater or solution having non-struvite calcium-sequestered phosphate is afforded.

2. The method of claim 1, wherein accumulating is in the presence of sufficient concentrations of $NH_4^+$ and $Mg^{+2}$ ions and at a pH sufficient to ensure that a sufficient proportion of phosphate ions are completely deprotonated, and comprises accumulating into struvite (magnesium ammonium phosphate hexahydrate or $MgNH_4PO_4.6H_2O$), or hydrated magnesium ammonium complex of phosphate.

3. The method of claims 2, further comprising recovering the struvite, or the formed hydrated magnesium ammonium complex.

4. The method of claim 1, further comprising acidification of the fluid composition, effluent, wastewater or solution to facilitate release of $Ca^{++}$ ions from the calcium-sequestered phosphate, and chelation of sequestration of the $Ca^{++}$ ions by the calcium chelating or sequestration agent.

5. The method of claim 4, where acidification is by means of addition of hydrochloric acid.

6. The method of claim 1, wherein the agent suitable to chelate or sequester $Ca^{++}$ ions from the calcium-sequestered phosphate is at least one selected from the group consisting of citric acid, citrate-containing substances, EDTA, ethylenediaminetetraacetate-containing substances, EGTA, EGTA anion-containing substances, oxalic acid, and oxalate-containing substances.

7. The method of claim 2, wherein the sufficient concentration of at least one of $NH_4^+$ and $Mg^{+2}$ ions is present in the effluent, wastewater or solution.

8. The method of claim 2, wherein the sufficient concentration of $NH_4^+$ ion is present in the effluent, wastewater or solution, and $Mg^{+2}$ is subsequently added to a sufficient level.

9. The method of claim 2, wherein the sufficient concentration of at least one of $NH_4^+$ and $Mg^{+2}$ ions is added to the effluent, wastewater or solution either before, during or after adding the agent suitable to provide for chelating or sequestering $Ca^{++}$ ions from the calcium-sequestered phosphate.

10. The method of claim 9, wherein the sufficient concentration of at least one of $NH_4^+$ and $Mg^{+2}$ ions is added to the effluent, wastewater or solution after adding the agent suitable to provide for chelating or sequestering $Ca^{++}$ ions from the calcium-sequestered phosphate.

11. A method for providing a phosphate-containing fertilizer, comprising:
   obtaining a fluid composition, effluent, wastewater or solution comprising non-struvite calcium-sequestered phosphate;
   adding to the fluid composition, effluent, wastewater or solution a calcium chelating or sequestration agent suitable to chelate or sequester $Ca^{++}$ ions from the non-struvite calcium-sequestered phosphate to facilitate release of phosphate from the non-struvite calcium-sequestered phosphate;
   accumulating, facilitated by said $Ca^{++}$ ion capture, the released phosphate into struvite (magnesium ammonium phosphate hexahydrate or $MgNH_4PO_4.6H_2O$), or hydrated magnesium ammonium complex of phosphate, wherein phosphate is redistributed from the non-struvite calcium sequestered phosphate into struvite; and
   providing the struvite or hydrated magnesium ammonium complex of phosphate as a fertilizer composition, wherein a method for providing a phosphate-containing fertilizer is afforded.

12. The method of claim 11, wherein accumulating is in the presence of sufficient concentrations of $NH_4^+$ and $Mg^{+2}$ ions and at a pH sufficient to ensure that a sufficient proportion of phosphate ions are completely deprotonated, and comprises accumulating into struvite (magnesium ammonium phosphate hexahydrate or $MgNH_4PO_4.6H_2O$), or hydrated magnesium ammonium complex of phosphate.

13. The method of claims 12, further comprising recovering the struvite, or the formed hydrated magnesium ammonium complex.

14. The method of claim 11, further comprising acidification of the fluid composition, effluent, wastewater or solution to facilitate release of $Ca^{++}$ ions from the calcium-sequestered phosphate, and chelation of sequestration of the $Ca^{++}$ ions by the calcium chelating or sequestration agent.

15. The method of claim 14, where acidification is by means of addition of hydrochloric acid.

16. The method of claim 11, wherein the agent suitable to chelate or sequester $Ca^{++}$ ions from the calcium-sequestered phosphate is at least one selected from the group consisting of citric acid, citrate-containing substances, EDTA, ethylenediaminetetraacetate-containing substances, EGTA, EGTA anion-containing substances, oxalic acid, and oxalate-containing substances.

17. The method of claim 12, wherein the sufficient concentration of at least one of $NH_4^+$ and $Mg^{+2}$ ions is present in the effluent, wastewater or solution.

18. The method of claim 12, wherein the sufficient concentration of $NH_4^+$ ion is present in the effluent, wastewater or solution, and $Mg^{+2}$ is subsequently added to a sufficient level.

19. The method of claim 12, wherein the sufficient concentration of at least one of $NH_4^+$ and $Mg^{+2}$ ions is added to the effluent, wastewater or solution either before, during or after adding the agent suitable to provide for chelating or sequestering $Ca^{++}$ ions from the calcium-sequestered phosphate.

20. The method of claim 19, wherein the sufficient concentration of at least one of $NH_4^+$ and $Mg^{+2}$ ions is added to the effluent, wastewater or solution after adding the agent suitable to provide for chelating or sequestering $Ca^{++}$ ions from the calcium-sequestered phosphate.

21. A fertilizer prepared by the method of any one of claims 11-20.

22. A method for recovery of phosphate, in the form of struvite, from a fluid composition, effluent, wastewater or solution having non-struvite calcium-sequestered phosphate, comprising:
   obtaining a fluid composition, effluent, wastewater or solution comprising non-struvite calcium-sequestered phosphate;
   adding to the fluid composition, effluent, wastewater or solution a calcium chelating or sequestration agent suitable to chelate or sequester $Ca^{++}$ ions from the non-struvite calcium-sequestered phosphate to facilitate release of phosphate from the non-struvite calcium-sequestered phosphate; and
   accumulating, facilitated by said $Ca^{++}$ ion capture, the released phosphate into struvite (magnesium ammonium phosphate hexahydrate or $MgNH_4PO_4.6H_2O$), wherein phosphate is redistributed from the non-struvite calcium sequestered phosphate into struvite, wherein accumulating is in the presence of sufficient concentrations of $NH_4^+$ and $Mg^+$ ions and at a pH sufficient to ensure that a sufficient proportion of phosphate ions are completely deprotonated, and wherein a method for recovery of phosphate, in the form of struvite, from a fluid composition, effluent, wastewater or solution having non-struvite calcium-sequestered phosphate is afforded.

23. A method for providing a phosphate-containing fertilizer, comprising:
   obtaining a fluid composition, effluent, wastewater or solution comprising non-struvite calcium-sequestered phosphate;
   adding to the fluid composition, effluent, wastewater or solution a calcium chelating or sequestration agent suitable to chelate or sequester $Ca^{++}$ ions from the non-struvite calcium-sequestered phosphate to facilitate release of phosphate from the non-struvite calcium-sequestered phosphate;
   accumulating, facilitated by said $Ca^{++}$ ion capture, the released phosphate into struvite (magnesium ammonium phosphate hexahydrate or $MgNH_4PO_4.6H_2O$), wherein phosphate is redistributed from the non-struvite calcium sequestered phosphate into struvite, wherein accumulating is in the presence of sufficient concentrations of $NH_4^+$ and $Mg^{+2}$ ions and at a pH sufficient to ensure that a sufficient proportion of phosphate ions are completely deprotonated; and
   providing the struvite as a fertilizer composition, wherein a method for providing a phosphate-containing fertilizer is afforded.

* * * * *